(12) United States Patent
Stephens et al.

(10) Patent No.: US 11,214,137 B2
(45) Date of Patent: Jan. 4, 2022

(54) VEHICLE BATTERY TRAY STRUCTURE WITH NODAL MODULARITY

(71) Applicant: Shape Corp., Grand Haven, MI (US)

(72) Inventors: Mark Charles Stephens, Grand Rapids, MI (US); Joseph Robert Matecki, Allendale, MI (US); Ed C. Pendergrass, West Olive, MI (US)

(73) Assignee: Shape Corp., Grand Haven, MI (US)

( * ) Notice: Subject to any disclaimer, the term of this patent is extended or adjusted under 35 U.S.C. 154(b) by 422 days.

(21) Appl. No.: 15/862,200

(22) Filed: Jan. 4, 2018

(65) Prior Publication Data
US 2018/0186227 A1    Jul. 5, 2018

Related U.S. Application Data

(60) Provisional application No. 62/506,938, filed on May 16, 2017, provisional application No. 62/442,013, filed on Jan. 4, 2017.

(51) Int. Cl.
| | |
|---|---|
| *B60K 1/04* | (2019.01) |
| *B60L 50/60* | (2019.01) |
| *H01M 50/20* | (2021.01) |

(52) U.S. Cl.
CPC .............. *B60K 1/04* (2013.01); *B60L 50/66* (2019.02); *H01M 50/20* (2021.01);
(Continued)

(58) Field of Classification Search
CPC .. B60K 1/04; B60K 50/66; B60K 2001/0438; H01M 2/1083; H01M 50/20;
(Continued)

(56) References Cited

U.S. PATENT DOCUMENTS

| | | |
|---|---|---|
| 3,708,028 A | 1/1973 | Hafer |
| 3,930,552 A | 1/1976 | Kunkle et al. |
| | (Continued) | |

FOREIGN PATENT DOCUMENTS

| | | |
|---|---|---|
| AT | 511428 | 11/2012 |
| AT | 511670 | 1/2013 |
| | (Continued) | |

OTHER PUBLICATIONS

Machine English Language Translation of JP 2013-133044A (Year: 2013).*

(Continued)

*Primary Examiner* — Eli S Mekhlin
*Assistant Examiner* — Kourtney R S Carlson
(74) *Attorney, Agent, or Firm* — Bodman PLC

(57) ABSTRACT

A battery support structure for a vehicle includes a plurality of side reinforcement members and front and rear reinforcement members. The plurality of side reinforcement members are configured to extend longitudinally relative to an associated vehicle frame, and the front and rear reinforcement members are configured to extend laterally relative to the associated vehicle frame. A plurality of module nodes are attached between adjacent ends of the side reinforcement members and the front and rear members to together form a containment wall that generally surrounds a battery containment area. The plurality of module nodes comprise corner sections of the containment wall, such that a length of the side reinforcement members or the front and rear reinforcement members is selected to provide a desired respective length or width of the battery containment area.

22 Claims, 11 Drawing Sheets

(52) U.S. Cl.
CPC ... *B60K 2001/0438* (2013.01); *B60Y 2306/01* (2013.01); *H01M 2220/20* (2013.01); *Y02T 10/70* (2013.01)

(58) Field of Classification Search
CPC ............. H01M 50/204; H01M 50/223; H01M 50/249; B60L 50/66
USPC .................................. 429/176; 136/242–265
See application file for complete search history.

(56) References Cited

U.S. PATENT DOCUMENTS

| | | |
|---|---|---|
| 3,983,952 A | 10/1976 | McKee |
| 4,174,014 A | 11/1979 | Bjorksten |
| 4,252,206 A | 2/1981 | Burkholder et al. |
| 4,317,497 A | 3/1982 | Alt et al. |
| 4,339,015 A | 7/1982 | Fowkes et al. |
| 4,506,748 A | 3/1985 | Thomas |
| 5,015,545 A | 5/1991 | Brooks |
| 5,198,638 A | 3/1993 | Massacesi |
| 5,378,555 A | 1/1995 | Waters et al. |
| 5,390,754 A | 2/1995 | Masuyama et al. |
| 5,392,873 A | 2/1995 | Masuyma et al. |
| 5,476,151 A | 12/1995 | Tsuchida et al. |
| 5,501,289 A | 3/1996 | Nishikawa et al. |
| 5,513,721 A | 5/1996 | Ogawa et al. |
| 5,523,666 A | 6/1996 | Hoelzl et al. |
| 5,534,364 A | 7/1996 | Watanabe et al. |
| 5,549,443 A | 8/1996 | Hammerslag |
| 5,555,950 A | 9/1996 | Harada et al. |
| 5,558,949 A | 9/1996 | Iwatsuki et al. |
| 5,561,359 A | 10/1996 | Matsuura et al. |
| 5,567,542 A | 10/1996 | Bae |
| 5,585,204 A | 12/1996 | Oshida et al. |
| 5,585,205 A | 12/1996 | Kohchi |
| 5,612,606 A | 3/1997 | Guimarin et al. |
| 5,620,057 A | 4/1997 | Klemen et al. |
| 5,709,280 A | 1/1998 | Beckley et al. |
| 5,736,272 A | 4/1998 | Veenstra et al. |
| 5,760,569 A | 6/1998 | Chase, Jr. |
| 5,833,023 A | 11/1998 | Shimizu |
| 5,853,058 A | 12/1998 | Endo et al. |
| 5,866,276 A | 2/1999 | Ogami et al. |
| 5,934,053 A | 8/1999 | Fillman et al. |
| 6,040,080 A | 3/2000 | Minami et al. |
| 6,079,984 A | 6/2000 | Torres et al. |
| 6,085,854 A | 7/2000 | Nishikawa |
| 6,094,927 A | 8/2000 | Anazawa et al. |
| 6,109,380 A | 8/2000 | Veenstra |
| 6,130,003 A | 10/2000 | Etoh et al. |
| 6,158,538 A | 12/2000 | Botzelmann et al. |
| 6,188,574 B1 | 2/2001 | Anazawa |
| 6,189,635 B1 | 2/2001 | Schuler et al. |
| 6,220,380 B1 | 4/2001 | Mita et al. |
| 6,227,322 B1 | 5/2001 | Nishikawa |
| 6,260,645 B1 | 7/2001 | Pawlowski et al. |
| 6,402,229 B1 | 6/2002 | Suganuma |
| 6,406,812 B1 | 6/2002 | Dreulle et al. |
| 6,462,949 B1 | 10/2002 | Parish, IV et al. |
| 6,541,151 B2 | 4/2003 | Minamiura et al. |
| 6,541,154 B2 | 4/2003 | Oogami et al. |
| 6,565,836 B2 | 5/2003 | Ovshinsky et al. |
| 6,598,691 B2 | 7/2003 | Mita et al. |
| 6,648,090 B2 | 11/2003 | Iwase |
| 6,668,957 B2 | 12/2003 | King |
| 6,736,229 B1 | 5/2004 | Amori et al. |
| 6,811,197 B1 | 11/2004 | Grabowski et al. |
| 7,004,274 B2 | 2/2006 | Shibasawa et al. |
| 7,017,361 B2 | 3/2006 | Kwon |
| 7,070,015 B2 | 7/2006 | Mathews et al. |
| 7,128,999 B1 | 10/2006 | Martin et al. |
| 7,201,384 B2 | 4/2007 | Chaney |
| 7,207,405 B2 | 4/2007 | Reid et al. |
| 7,221,123 B2 | 5/2007 | Chen |
| 7,249,644 B2 | 7/2007 | Honda et al. |
| 7,267,190 B2 | 9/2007 | Hirano |
| 7,323,272 B2 | 1/2008 | Ambrosio et al. |
| 7,401,669 B2 | 7/2008 | Fujii et al. |
| 7,405,022 B2 | 7/2008 | Kang et al. |
| 7,412,309 B2 | 8/2008 | Honda |
| 7,416,039 B1 | 8/2008 | Anderson et al. |
| 7,424,926 B2 | 9/2008 | Tsuchiya |
| 7,427,156 B2 | 9/2008 | Ambrosio et al. |
| 7,501,793 B2 | 3/2009 | Kadouchi et al. |
| 7,507,499 B2 | 3/2009 | Zhou et al. |
| 7,520,355 B2 | 4/2009 | Chaney |
| 7,610,978 B2 | 11/2009 | Takasaki et al. |
| 7,654,351 B2 | 2/2010 | Koike et al. |
| 7,654,352 B2 | 2/2010 | Takasaki et al. |
| 7,661,370 B2 | 2/2010 | Pike et al. |
| 7,686,111 B2 | 3/2010 | Koenekamp et al. |
| 7,687,192 B2 | 3/2010 | Yoon et al. |
| 7,713,655 B2 | 5/2010 | Ha et al. |
| 7,749,644 B2 | 7/2010 | Nishino |
| 7,807,288 B2 | 10/2010 | Yoon et al. |
| 7,854,282 B2 | 12/2010 | Lee et al. |
| 7,858,229 B2 | 12/2010 | Shin et al. |
| 7,875,378 B2 | 1/2011 | Yang et al. |
| 7,879,480 B2 | 2/2011 | Yoon et al. |
| 7,879,485 B2 | 2/2011 | Yoon et al. |
| 7,913,788 B1 * | 3/2011 | Bryer ................... B60K 15/063 180/68.5 |
| 7,926,602 B2 | 4/2011 | Takasaki |
| 7,931,105 B2 | 4/2011 | Sato et al. |
| 7,948,207 B2 | 5/2011 | Scheucher |
| 7,967,093 B2 | 6/2011 | Nagasaka |
| 7,984,779 B2 | 7/2011 | Boegelein et al. |
| 7,990,105 B2 | 8/2011 | Matsumoto et al. |
| 7,993,155 B2 | 8/2011 | Heichal et al. |
| 7,997,368 B2 | 8/2011 | Takasaki et al. |
| 8,006,626 B2 | 8/2011 | Kumar et al. |
| 8,006,793 B2 | 8/2011 | Heichal et al. |
| 8,012,620 B2 | 9/2011 | Takasaki et al. |
| 8,034,476 B2 | 10/2011 | Ha et al. |
| 8,037,954 B2 | 10/2011 | Taguchi |
| 8,079,435 B2 | 12/2011 | Takasaki et al. |
| 8,091,669 B2 | 1/2012 | Taneda et al. |
| 8,110,300 B2 | 2/2012 | Niedzwiecki et al. |
| 8,146,694 B2 | 4/2012 | Hamidi |
| 8,163,420 B2 | 4/2012 | Okada et al. |
| 8,167,070 B2 | 5/2012 | Takamura et al. |
| 8,186,468 B2 | 5/2012 | Parrett et al. |
| 8,187,736 B2 | 5/2012 | Park et al. |
| 8,205,702 B2 | 6/2012 | Hoermandinger et al. |
| 8,206,846 B2 | 6/2012 | Yang et al. |
| 8,210,301 B2 | 7/2012 | Hashimoto et al. |
| 8,211,564 B2 | 7/2012 | Choi et al. |
| 8,256,552 B2 | 9/2012 | Okada |
| 8,268,469 B2 | 9/2012 | Harmann et al. |
| 8,268,472 B2 | 9/2012 | Ronning et al. |
| 8,276,697 B2 | 10/2012 | Takasaki |
| 8,286,743 B2 | 10/2012 | Rawlinson |
| 8,298,698 B2 | 10/2012 | Chung et al. |
| 8,304,104 B2 | 11/2012 | Lee et al. |
| 8,307,930 B2 | 11/2012 | Sailor et al. |
| 8,323,819 B2 | 12/2012 | Lee et al. |
| 8,327,962 B2 | 12/2012 | Bergmeier et al. |
| 8,343,647 B2 | 1/2013 | Ahn et al. |
| 8,353,374 B2 | 1/2013 | Sugawara et al. |
| 8,371,401 B1 | 2/2013 | Illustrato |
| 8,397,853 B2 | 3/2013 | Stefani et al. |
| 8,409,743 B2 | 4/2013 | Okada et al. |
| 8,418,795 B2 | 4/2013 | Sasage et al. |
| 8,420,245 B2 | 4/2013 | Im et al. |
| 8,439,144 B2 | 5/2013 | Murase |
| 8,453,773 B2 | 6/2013 | Hill et al. |
| 8,453,778 B2 | 6/2013 | Bannier et al. |
| 8,455,122 B2 | 6/2013 | Shin et al. |
| 8,465,866 B2 | 6/2013 | Kim |
| 8,481,343 B2 | 7/2013 | Hsin et al. |
| 8,486,557 B2 | 7/2013 | Lee et al. |
| 8,492,016 B2 | 7/2013 | Shin et al. |
| 8,501,344 B2 | 8/2013 | Yang et al. |
| 8,511,412 B2 | 8/2013 | Kawaguchi et al. |

(56) References Cited

U.S. PATENT DOCUMENTS

| | | |
|---|---|---|
| 8,540,282 B2 | 9/2013 | Yoda et al. |
| 8,551,640 B2 | 10/2013 | Hedrich et al. |
| 8,557,425 B2 | 10/2013 | Ronning et al. |
| 8,561,743 B2 | 10/2013 | Iwasa et al. |
| 8,563,155 B2 | 10/2013 | Lee et al. |
| 8,567,543 B2 | 10/2013 | Kubota et al. |
| 8,584,780 B2 | 11/2013 | Yu et al. |
| 8,587,907 B2 | 11/2013 | Gaben |
| 8,592,069 B1 | 11/2013 | Anderson et al. |
| 8,602,139 B2 | 12/2013 | Takamura et al. |
| 8,609,271 B2 | 12/2013 | Yoon et al. |
| 8,658,303 B2 | 2/2014 | Chung et al. |
| 8,672,077 B2 | 3/2014 | Sand et al. |
| 8,672,354 B2 | 3/2014 | Kim et al. |
| 8,689,918 B2 | 4/2014 | Yu et al. |
| 8,689,919 B2 | 4/2014 | Maeda et al. |
| 8,691,421 B2 | 4/2014 | Lee et al. |
| 8,708,080 B2 | 4/2014 | Lee et al. |
| 8,708,402 B2 | 4/2014 | Saeki |
| 8,709,628 B2 | 4/2014 | Carignan et al. |
| 8,722,224 B2 | 5/2014 | Lee et al. |
| 8,728,648 B2 | 5/2014 | Choo et al. |
| 8,733,486 B2 | 5/2014 | Nishiura et al. |
| 8,733,488 B2 | 5/2014 | Umetani |
| 8,739,908 B2 | 6/2014 | Taniguchi et al. |
| 8,739,909 B2 | 6/2014 | Hashimoto et al. |
| 8,741,466 B2 | 6/2014 | Youngs et al. |
| 8,746,391 B2 | 6/2014 | Atsuchi et al. |
| 8,757,304 B2 | 6/2014 | Amano et al. |
| 8,789,634 B2 | 7/2014 | Nitawaki |
| 8,794,365 B2 | 8/2014 | Matsuzawa et al. |
| 8,802,259 B2 | 8/2014 | Lee et al. |
| 8,803,477 B2 | 8/2014 | Kittell |
| 8,808,893 B2 | 8/2014 | Choo et al. |
| 8,818,588 B2 | 8/2014 | Ambrosio et al. |
| 8,820,444 B2 | 9/2014 | Nguyen |
| 8,820,461 B2 | 9/2014 | Shinde et al. |
| 8,827,023 B2 | 9/2014 | Matsuda et al. |
| 8,833,495 B2 | 9/2014 | Iwata et al. |
| 8,833,499 B2 | 9/2014 | Rawlinson |
| 8,835,033 B2 | 9/2014 | Choi et al. |
| 8,841,013 B2 | 9/2014 | Choo et al. |
| 8,846,233 B2 | 9/2014 | Lee et al. |
| 8,846,234 B2 | 9/2014 | Lee et al. |
| 8,852,794 B2 | 10/2014 | Laitinen |
| 8,862,296 B2 | 10/2014 | Kurakawa et al. |
| 8,865,332 B2 | 10/2014 | Yang et al. |
| 8,875,828 B2 | 11/2014 | Rawlinson et al. |
| 8,895,173 B2 | 11/2014 | Gandhi et al. |
| 8,900,736 B2 | 12/2014 | Choi et al. |
| 8,905,170 B2 | 12/2014 | Kyoden et al. |
| 8,905,171 B2 | 12/2014 | Lee et al. |
| 8,911,899 B2 | 12/2014 | Lim et al. |
| 8,936,125 B2 | 1/2015 | Nakamori |
| 8,939,245 B2 | 1/2015 | Jaffrezic |
| 8,939,246 B2 | 1/2015 | Yamaguchi et al. |
| 8,951,655 B2 | 2/2015 | Chung et al. |
| 8,960,346 B2 | 2/2015 | Ogawa |
| 8,970,061 B2 | 3/2015 | Nakagawa et al. |
| 8,973,697 B2 | 3/2015 | Matsuda |
| 8,975,774 B2 | 3/2015 | Kreutzer et al. |
| 8,978,800 B2 | 3/2015 | Soma' et al. |
| 8,980,458 B2 | 3/2015 | Honjo et al. |
| 8,986,864 B2 | 3/2015 | Wiegmann et al. |
| 9,004,535 B2 | 4/2015 | Wu |
| 9,012,051 B2 | 4/2015 | Lee et al. |
| 9,017,846 B2 | 4/2015 | Kawatani et al. |
| 9,023,502 B2 | 5/2015 | Favaretto |
| 9,023,503 B2 | 5/2015 | Seong et al. |
| 9,024,572 B2 | 5/2015 | Nishihara et al. |
| 9,033,084 B2 | 5/2015 | Joye |
| 9,033,085 B1 | 5/2015 | Rawlinson |
| 9,034,502 B2 | 5/2015 | Kano et al. |
| 9,052,168 B1 | 6/2015 | Rawlinson |
| 9,054,402 B1 | 6/2015 | Rawlinson |
| 9,061,714 B1 | 6/2015 | Albery et al. |
| 9,065,103 B2 | 6/2015 | Straubel et al. |
| 9,070,926 B2 | 6/2015 | Seong et al. |
| 9,073,426 B2 | 7/2015 | Tachikawa et al. |
| 9,077,058 B2 | 7/2015 | Yang et al. |
| 9,090,218 B2 | 7/2015 | Karashima |
| 9,093,701 B2 | 7/2015 | Kawatani et al. |
| 9,101,060 B2 | 8/2015 | Yamanaka et al. |
| 9,102,362 B2 | 8/2015 | Baccouche et al. |
| 9,126,637 B2 | 9/2015 | Eberle et al. |
| 9,136,514 B2 | 9/2015 | Kawatani et al. |
| 9,156,340 B2 | 10/2015 | Van den Akker |
| 9,159,968 B2 | 10/2015 | Park et al. |
| 9,159,970 B2 | 10/2015 | Watanabe et al. |
| 9,160,042 B2 | 10/2015 | Fujii et al. |
| 9,160,214 B2 | 10/2015 | Matsuda |
| 9,172,071 B2 | 10/2015 | Yoshioka et al. |
| 9,174,520 B2 | 11/2015 | Katayama et al. |
| 9,184,477 B2 | 11/2015 | Jeong et al. |
| 9,192,450 B2 | 11/2015 | Yamashita et al. |
| 9,193,316 B2 | 11/2015 | McLaughlin et al. |
| 9,196,882 B2 | 11/2015 | Seong et al. |
| 9,203,064 B2 | 12/2015 | Lee et al. |
| 9,203,124 B2 | 12/2015 | Chung et al. |
| 9,205,749 B2 | 12/2015 | Sakamoto |
| 9,205,757 B2 | 12/2015 | Matsuda |
| 9,216,638 B2 | 12/2015 | Katayama et al. |
| 9,227,582 B2 | 1/2016 | Katayama et al. |
| 9,231,285 B2 | 1/2016 | Schmidt et al. |
| 9,236,587 B2 | 1/2016 | Lee et al. |
| 9,236,589 B2 | 1/2016 | Lee |
| 9,238,495 B2 | 1/2016 | Matsuda |
| 9,246,148 B2 | 1/2016 | Maguire |
| 9,252,409 B2 | 2/2016 | Lee et al. |
| 9,254,871 B2 | 2/2016 | Hotta et al. |
| 9,263,249 B2 | 2/2016 | Tomohiro et al. |
| 9,269,934 B2 | 2/2016 | Yang et al. |
| 9,277,674 B2 | 3/2016 | Watanabe |
| 9,281,505 B2 | 3/2016 | Hihara et al. |
| 9,281,546 B2 | 3/2016 | Chung et al. |
| 9,283,837 B1 | 3/2016 | Rawlinson |
| 9,306,201 B2 | 4/2016 | Lu et al. |
| 9,306,247 B2 | 4/2016 | Rawlinson |
| 9,308,829 B2 | 4/2016 | Matsuda |
| 9,308,966 B2 | 4/2016 | Kosuge et al. |
| 9,312,579 B2 | 4/2016 | Jeong et al. |
| 9,321,357 B2 | 4/2016 | Caldeira et al. |
| 9,321,433 B2 | 4/2016 | Yin et al. |
| 9,327,586 B2 | 5/2016 | Miyashiro |
| 9,331,321 B2 | 5/2016 | Berger et al. |
| 9,331,366 B2 | 5/2016 | Fuerstner et al. |
| 9,333,868 B2 | 5/2016 | Uchida et al. |
| 9,337,455 B2 | 5/2016 | Yang et al. |
| 9,337,457 B2 | 5/2016 | Yajima et al. |
| 9,337,458 B2 | 5/2016 | Kim |
| 9,337,516 B2 | 5/2016 | Klausner et al. |
| 9,346,346 B2 | 5/2016 | Murray |
| 9,350,003 B2 | 5/2016 | Wen et al. |
| 9,358,869 B2 | 6/2016 | Le Jaouen et al. |
| 9,373,828 B2 | 6/2016 | Kawatani et al. |
| 9,381,798 B2 | 7/2016 | Meyer-Ebeling |
| 9,412,984 B2 | 8/2016 | Fritz et al. |
| 9,413,043 B2 | 8/2016 | Kim et al. |
| 9,425,628 B2 | 8/2016 | Pham et al. |
| 9,434,243 B2 | 9/2016 | Nakao |
| 9,434,270 B1 | 9/2016 | Penilla et al. |
| 9,434,333 B2 | 9/2016 | Sloan et al. |
| 9,444,082 B2 | 9/2016 | Tsujimura et al. |
| 9,446,643 B1 | 9/2016 | Vollmer |
| 9,450,228 B2 | 9/2016 | Sakai et al. |
| 9,452,686 B2 | 9/2016 | Yang et al. |
| 9,457,666 B2 | 10/2016 | Caldeira et al. |
| 9,461,284 B2 | 10/2016 | Power et al. |
| 9,461,454 B2 | 10/2016 | Auguet et al. |
| 9,463,695 B2 | 10/2016 | Matsuda et al. |
| 9,478,778 B2 | 10/2016 | Im et al. |
| 9,481,249 B2 | 11/2016 | Yamazaki |
| 9,484,564 B2 | 11/2016 | Stuetz et al. |
| 9,484,592 B2 | 11/2016 | Roh et al. |

(56) References Cited

U.S. PATENT DOCUMENTS

| | | |
|---|---|---|
| 9,487,237 B1 | 11/2016 | Vollmer |
| 9,502,700 B2 | 11/2016 | Haussman |
| 9,520,624 B2 | 12/2016 | Lee et al. |
| 9,531,041 B2 | 12/2016 | Hwang |
| 9,533,546 B2 | 1/2017 | Cheng |
| 9,533,600 B1 | 1/2017 | Schwab et al. |
| 9,537,186 B2 | 1/2017 | Chung et al. |
| 9,537,187 B2 | 1/2017 | Chung et al. |
| 9,540,055 B2 | 1/2017 | Berger et al. |
| 9,545,962 B2 | 1/2017 | Pang |
| 9,545,968 B2 | 1/2017 | Miyashiro et al. |
| 9,561,735 B2 | 2/2017 | Nozaki |
| 9,564,663 B2 | 2/2017 | Kim et al. |
| 9,564,664 B2 | 2/2017 | Tanigaki et al. |
| 9,579,963 B2 | 2/2017 | Landgraf |
| 9,579,983 B2 | 2/2017 | Inoue |
| 9,579,986 B2 | 2/2017 | Bachir |
| 9,590,216 B2 | 3/2017 | Maguire et al. |
| 9,597,973 B2 | 3/2017 | Penilla et al. |
| 9,597,976 B2 | 3/2017 | Dickinson et al. |
| 9,608,244 B2 | 3/2017 | Shin et al. |
| 9,614,206 B2 | 4/2017 | Choi et al. |
| 9,614,260 B2 | 4/2017 | Kim et al. |
| 9,616,766 B2 | 4/2017 | Fujii |
| 9,620,826 B2 | 4/2017 | Yang et al. |
| 9,623,742 B2 | 4/2017 | Ikeda et al. |
| 9,623,911 B2 | 4/2017 | Kano et al. |
| 9,627,664 B2 | 4/2017 | Choo et al. |
| 9,627,666 B2 | 4/2017 | Baldwin |
| 9,630,483 B2 | 4/2017 | Yamada et al. |
| 9,636,984 B1 | 5/2017 | Baccouche et al. |
| 9,643,660 B2 | 5/2017 | Vollmer |
| 9,647,251 B2 | 5/2017 | Prinz et al. |
| 9,653,712 B2 | 5/2017 | Seong et al. |
| 9,660,236 B2 | 5/2017 | Kondo et al. |
| 9,660,288 B2 | 5/2017 | Gendlin et al. |
| 9,660,304 B2 | 5/2017 | Choi et al. |
| 9,673,433 B1 | 6/2017 | Pullalarevu et al. |
| 9,673,495 B2 | 6/2017 | Lee et al. |
| 9,692,095 B2 | 6/2017 | Harris |
| 9,694,772 B2 | 7/2017 | Ikeda et al. |
| 9,718,340 B2 | 8/2017 | Berger et al. |
| 9,789,908 B2 | 10/2017 | Tsukada et al. |
| 9,796,424 B2 | 10/2017 | Sakaguchi et al. |
| 9,802,650 B2 | 10/2017 | Nishida et al. |
| 10,059,382 B2 | 8/2018 | Nusier et al. |
| 2001/0046624 A1 | 11/2001 | Goto et al. |
| 2001/0052433 A1 | 12/2001 | Harris et al. |
| 2002/0066608 A1 | 6/2002 | Guenard et al. |
| 2003/0089540 A1 | 5/2003 | Koike et al. |
| 2003/0188417 A1 | 10/2003 | McGlinchy et al. |
| 2003/0209375 A1 | 11/2003 | Suzuki et al. |
| 2003/0230443 A1 | 12/2003 | Cramer et al. |
| 2004/0142232 A1 | 7/2004 | Risca et al. |
| 2004/0261377 A1 | 12/2004 | Sung |
| 2005/0095500 A1 | 5/2005 | Corless et al. |
| 2006/0001399 A1 | 1/2006 | Salasoo et al. |
| 2006/0024566 A1 | 2/2006 | Plummer |
| 2008/0179040 A1 | 7/2008 | Rosenbaum |
| 2008/0199771 A1 | 8/2008 | Chiu |
| 2008/0238152 A1 | 10/2008 | Konishi et al. |
| 2008/0280192 A1 | 11/2008 | Drozdz et al. |
| 2008/0311468 A1 | 12/2008 | Hermann et al. |
| 2009/0014221 A1 | 1/2009 | Kim et al. |
| 2009/0058355 A1 | 3/2009 | Meyer |
| 2010/0025131 A1 | 2/2010 | Gloceri et al. |
| 2010/0112419 A1 | 5/2010 | Jang et al. |
| 2010/0159317 A1 | 6/2010 | Taghikhami et al. |
| 2010/0173191 A1 | 7/2010 | Meintschel et al. |
| 2010/0307848 A1 | 12/2010 | Hashimoto et al. |
| 2011/0036657 A1 | 2/2011 | Bland et al. |
| 2011/0070474 A1 | 3/2011 | Lee et al. |
| 2011/0104530 A1 | 5/2011 | Muller et al. |
| 2011/0123309 A1 | 5/2011 | Berdelle-Hilge et al. |
| 2011/0132580 A1 | 6/2011 | Herrmann et al. |
| 2011/0143179 A1* | 6/2011 | Nakamori .......... H01M 2/1083 429/99 |
| 2011/0168461 A1 | 7/2011 | Meyer-Ebeling |
| 2011/0240385 A1 | 10/2011 | Farmer |
| 2012/0091955 A1 | 4/2012 | Gao |
| 2012/0103714 A1 | 5/2012 | Choi et al. |
| 2012/0118653 A1 | 5/2012 | Ogihara et al. |
| 2012/0125702 A1 | 5/2012 | Bergfjord |
| 2012/0129031 A1 | 5/2012 | Kim |
| 2012/0160583 A1 | 6/2012 | Rawlinson |
| 2012/0223113 A1 | 9/2012 | Gaisne et al. |
| 2012/0298433 A1 | 11/2012 | Ohkura |
| 2012/0301765 A1 | 11/2012 | Loo et al. |
| 2012/0312610 A1 | 12/2012 | Kim et al. |
| 2013/0020139 A1 | 1/2013 | Kim et al. |
| 2013/0122337 A1 | 5/2013 | Katayama et al. |
| 2013/0122338 A1 | 5/2013 | Katayama et al. |
| 2013/0143081 A1 | 6/2013 | Watanabe et al. |
| 2013/0164580 A1 | 6/2013 | Au |
| 2013/0192908 A1 | 8/2013 | Schlagheck |
| 2013/0230759 A1 | 9/2013 | Jeong et al. |
| 2013/0270863 A1 | 10/2013 | Young et al. |
| 2013/0273829 A1 | 10/2013 | Obasih et al. |
| 2013/0284531 A1 | 10/2013 | Oonuma et al. |
| 2013/0337297 A1 | 12/2013 | Lee et al. |
| 2014/0017546 A1 | 1/2014 | Yanagi |
| 2014/0045026 A1 | 2/2014 | Fritz et al. |
| 2014/0072845 A1 | 3/2014 | Oh et al. |
| 2014/0072856 A1 | 3/2014 | Chung et al. |
| 2014/0079965 A1* | 3/2014 | Schaefer .............. H01M 50/10 429/61 |
| 2014/0087228 A1 | 3/2014 | Fabian et al. |
| 2014/0120406 A1 | 5/2014 | Kim |
| 2014/0141298 A1 | 5/2014 | Michelitsch |
| 2014/0178721 A1 | 6/2014 | Chung et al. |
| 2014/0193683 A1 | 7/2014 | Mardall et al. |
| 2014/0202671 A1 | 7/2014 | Yan |
| 2014/0212723 A1 | 7/2014 | Lee et al. |
| 2014/0242429 A1 | 8/2014 | Lee et al. |
| 2014/0246259 A1 | 9/2014 | Yamamura et al. |
| 2014/0262573 A1 | 9/2014 | Ito et al. |
| 2014/0272501 A1 | 9/2014 | O'Brien et al. |
| 2014/0284125 A1 | 9/2014 | Katayama et al. |
| 2014/0302360 A1 | 10/2014 | Klammler et al. |
| 2014/0322583 A1 | 10/2014 | Choi et al. |
| 2014/0338999 A1 | 11/2014 | Fujii et al. |
| 2015/0004458 A1 | 1/2015 | Lee |
| 2015/0010795 A1 | 1/2015 | Tanigaki et al. |
| 2015/0053493 A1 | 2/2015 | Kees et al. |
| 2015/0056481 A1 | 2/2015 | Cohen et al. |
| 2015/0060164 A1 | 3/2015 | Wang et al. |
| 2015/0061381 A1 | 3/2015 | Biskup |
| 2015/0061413 A1 | 3/2015 | Janarthanam et al. |
| 2015/0064535 A1 | 3/2015 | Seong et al. |
| 2015/0104686 A1 | 4/2015 | Brommer et al. |
| 2015/0136506 A1 | 5/2015 | Quinn et al. |
| 2015/0188207 A1 | 7/2015 | Son et al. |
| 2015/0204583 A1* | 7/2015 | Stephan .................. F24S 25/67 403/375 |
| 2015/0207115 A1 | 7/2015 | Wondraczek |
| 2015/0236326 A1 | 8/2015 | Kim et al. |
| 2015/0243956 A1 | 8/2015 | Loo et al. |
| 2015/0255764 A1 | 9/2015 | Loo et al. |
| 2015/0259011 A1 | 9/2015 | Deckard et al. |
| 2015/0280188 A1 | 10/2015 | Nozaki et al. |
| 2015/0291046 A1 | 10/2015 | Kawabata |
| 2015/0298661 A1 | 10/2015 | Zhang |
| 2015/0314830 A1 | 11/2015 | Inoue |
| 2015/0329174 A1 | 11/2015 | Inoue |
| 2015/0329175 A1 | 11/2015 | Inoue |
| 2015/0329176 A1 | 11/2015 | Inoue |
| 2015/0344081 A1 | 12/2015 | Kor et al. |
| 2016/0023689 A1 | 1/2016 | Berger et al. |
| 2016/0028056 A1 | 1/2016 | Lee et al. |
| 2016/0068195 A1 | 3/2016 | Hentrich et al. |
| 2016/0072108 A1 | 3/2016 | Keller et al. |
| 2016/0087319 A1 | 3/2016 | Roh et al. |
| 2016/0093856 A1 | 3/2016 | DeKeuster et al. |
| 2016/0133899 A1 | 5/2016 | Qiao et al. |

(56) References Cited

U.S. PATENT DOCUMENTS

| | | | |
|---|---|---|---|
| 2016/0137046 A1 | 5/2016 | Song | |
| 2016/0141738 A1 | 5/2016 | Kwag | |
| 2016/0149177 A1 | 5/2016 | Sugeno et al. | |
| 2016/0156005 A1 | 6/2016 | Elliot et al. | |
| 2016/0159221 A1 | 6/2016 | Chen et al. | |
| 2016/0164053 A1 | 6/2016 | Lee et al. | |
| 2016/0167544 A1 | 6/2016 | Barbat et al. | |
| 2016/0176312 A1 | 6/2016 | Duhaime et al. | |
| 2016/0197332 A1 | 7/2016 | Lee et al. | |
| 2016/0197386 A1 | 7/2016 | Moon et al. | |
| 2016/0197387 A1 | 7/2016 | Lee et al. | |
| 2016/0204398 A1 | 7/2016 | Moon et al. | |
| 2016/0207418 A1 | 7/2016 | Bergstrom et al. | |
| 2016/0218335 A1 | 7/2016 | Baek | |
| 2016/0222631 A1 | 8/2016 | Kohno et al. | |
| 2016/0226040 A1 | 8/2016 | Mongeau et al. | |
| 2016/0226108 A1 | 8/2016 | Kim et al. | |
| 2016/0229309 A1 | 8/2016 | Mitsutani | |
| 2016/0233468 A1 | 8/2016 | Nusier et al. | |
| 2016/0236713 A1 | 8/2016 | Sakaguchi et al. | |
| 2016/0248060 A1 | 8/2016 | Brambrink et al. | |
| 2016/0248061 A1 | 8/2016 | Brambrink et al. | |
| 2016/0257219 A1 | 9/2016 | Miller et al. | |
| 2016/0280306 A1 | 9/2016 | Miyashiro et al. | |
| 2016/0308180 A1 | 10/2016 | Kohda | |
| 2016/0318579 A1 | 11/2016 | Miyashiro | |
| 2016/0339855 A1 | 11/2016 | Chinavare et al. | |
| 2016/0347161 A1 | 12/2016 | Kusumi et al. | |
| 2016/0361984 A1 | 12/2016 | Manganaro | |
| 2016/0368358 A1 | 12/2016 | Nagaosa | |
| 2016/0375750 A1 | 12/2016 | Hokazono et al. | |
| 2017/0001507 A1 | 1/2017 | Ashraf et al. | |
| 2017/0005303 A1 | 1/2017 | Harris et al. | |
| 2017/0005371 A1 | 1/2017 | Chidester et al. | |
| 2017/0005375 A1 | 1/2017 | Walker | |
| 2017/0029034 A1 | 2/2017 | Faruque et al. | |
| 2017/0047563 A1 | 2/2017 | Lee et al. | |
| 2017/0050533 A1 | 2/2017 | Wei et al. | |
| 2017/0054120 A1 | 2/2017 | Templeman et al. | |
| 2017/0062782 A1 | 3/2017 | Cho et al. | |
| 2017/0084890 A1 | 3/2017 | Subramanian et al. | |
| 2017/0088013 A1 | 3/2017 | Shimizu et al. | |
| 2017/0088178 A1 | 3/2017 | Tsukada et al. | |
| 2017/0106907 A1 | 4/2017 | Gong et al. | |
| 2017/0106908 A1 | 4/2017 | Song | |
| 2017/0144566 A1 | 5/2017 | Aschwer et al. | |
| 2017/0190243 A1 | 7/2017 | Duan et al. | |
| 2017/0194681 A1 | 7/2017 | Kim et al. | |
| 2017/0200925 A1 | 7/2017 | Seo et al. | |
| 2017/0214018 A1 | 7/2017 | Sun et al. | |
| 2017/0222199 A1 | 8/2017 | Idikurt et al. | |
| 2017/0232859 A1 | 8/2017 | Li | |
| 2017/0288185 A1 | 10/2017 | Maguire | |
| 2017/0331086 A1 | 11/2017 | Frehn et al. | |
| 2018/0050607 A1 | 2/2018 | Matecki et al. | |
| 2018/0062224 A1 | 3/2018 | Drabon et al. | |
| 2018/0154754 A1 | 6/2018 | Rowley et al. | |
| 2018/0186227 A1 | 7/2018 | Stephens et al. | |
| 2018/0229593 A1 | 8/2018 | Hitz et al. | |
| 2018/0233789 A1 | 8/2018 | Iqbal et al. | |
| 2018/0236863 A1 | 8/2018 | Kawabe et al. | |
| 2018/0237075 A1 | 8/2018 | Kawabe et al. | |
| 2018/0323409 A1 | 11/2018 | Maier | |
| 2018/0334022 A1 | 11/2018 | Rawlinson et al. | |
| 2018/0337374 A1 | 11/2018 | Matecki et al. | |
| 2018/0337377 A1 | 11/2018 | Stephens et al. | |
| 2018/0337378 A1 | 11/2018 | Stephens et al. | |
| 2019/0081298 A1 | 3/2019 | Matecki et al. | |
| 2019/0100090 A1 | 4/2019 | Matecki et al. | |

FOREIGN PATENT DOCUMENTS

| | | | |
|---|---|---|---|
| AU | 2008200543 | 8/2009 | |
| CN | 100429805 | 10/2008 | |
| CN | 100429806 | 10/2008 | |
| CN | 102452293 | 5/2012 | |
| CN | 102802983 | 11/2012 | |
| CN | 103568820 | 2/2014 | |
| CN | 104010884 | 8/2014 | |
| CN | 106029407 | 10/2016 | |
| CN | 205645923 U | 10/2016 | |
| CN | 106207029 A | 12/2016 | |
| CN | 106410077 | 2/2017 | |
| DE | 4105246 | 2/1991 | |
| DE | 4129351 | 5/1993 | |
| DE | 4427322 | 2/1996 | |
| DE | 19534427 | 3/1996 | |
| DE | 4446257 | 6/1996 | |
| DE | 202005018897 | 2/2006 | |
| DE | 102004062932 | 8/2006 | |
| DE | 102007012893 | 3/2008 | |
| DE | 102007017019 | 3/2008 | |
| DE | 102007030542 | 3/2008 | |
| DE | 102008024007 | 5/2008 | |
| DE | 102006049269 | 6/2008 | |
| DE | 202008006698 | 7/2008 | |
| DE | 102007011026 | 9/2008 | |
| DE | 102007021293 | 11/2008 | |
| DE | 102007044526 | 3/2009 | |
| DE | 102007050103 | 4/2009 | |
| DE | 102007063187 | 4/2009 | |
| DE | 102008051786 | 4/2009 | |
| DE | 102007063194 | 6/2009 | |
| DE | 102008034880 | 6/2009 | |
| DE | 102007061562 | 7/2009 | |
| DE | 102008010813 | 8/2009 | |
| DE | 102008034695 | 1/2010 | |
| DE | 102008034700 | 1/2010 | |
| DE | 102008034856 | 1/2010 | |
| DE | 102008034860 | 1/2010 | |
| DE | 102008034863 | 1/2010 | |
| DE | 102008034873 | 1/2010 | |
| DE | 102008034889 | 1/2010 | |
| DE | 102008052284 | 4/2010 | |
| DE | 102008059953 | 6/2010 | |
| DE | 102008059964 | 6/2010 | |
| DE | 102008059966 | 6/2010 | |
| DE | 102008059967 | 6/2010 | |
| DE | 102008059969 | 6/2010 | |
| DE | 102008059971 | 6/2010 | |
| DE | 102008054968 | 7/2010 | |
| DE | 102010006514 | 9/2010 | |
| DE | 102009019384 | 11/2010 | |
| DE | 102009035488 | 2/2011 | |
| DE | 102009040598 | 3/2011 | |
| DE | 102010014484 | 3/2011 | |
| DE | 102009043635 | 4/2011 | |
| DE | 102010007414 | 8/2011 | |
| DE | 102010009063 | 8/2011 | |
| DE | 102010012992 | 9/2011 | |
| DE | 102010012996 | 9/2011 | |
| DE | 102010013025 | 9/2011 | |
| DE | 102010028728 | 11/2011 | |
| DE | 102011011698 | 8/2012 | |
| DE | 102011013182 | 9/2012 | |
| DE | 102011016526 | 10/2012 | |
| DE | 102011017459 | 10/2012 | |
| DE | 102011075820 | 11/2012 | |
| DE | 102011103990 | 12/2012 | |
| DE | 102011080053 | 1/2013 | |
| DE | 102011107007 A1 | 1/2013 | |
| DE | 102011109309 | 2/2013 | |
| DE | 102011111537 | 2/2013 | |
| DE | 102011112598 | 3/2013 | |
| DE | 102011086049 | 5/2013 | |
| DE | 102011109011 | 5/2013 | |
| DE | 102011012010 | 6/2013 | |
| DE | 102012000622 | 7/2013 | |
| DE | 102012200350 A1 * | 7/2013 | .......... H01M 2/1083 |
| DE | 102012001596 | 8/2013 | |
| DE | 102012102657 | 10/2013 | |
| DE | 102012103149 | 10/2013 | |
| DE | 102013205215 | 10/2013 | |
| DE | 102013205323 | 10/2013 | |

(56) References Cited

FOREIGN PATENT DOCUMENTS

| | | |
|---|---|---|
| DE | 202013104224 | 10/2013 |
| DE | 102012012897 | 1/2014 |
| DE | 102012107548 | 2/2014 |
| DE | 102012219301 A1 | 2/2014 |
| DE | 202012104339 | 2/2014 |
| DE | 102012018057 | 3/2014 |
| DE | 102013200562 | 7/2014 |
| DE | 102013200726 | 7/2014 |
| DE | 102013200786 | 7/2014 |
| DE | 102013203102 | 8/2014 |
| DE | 102013102501 | 9/2014 |
| DE | 102013208996 A1 | 11/2014 |
| DE | 102013215082 | 2/2015 |
| DE | 102013218674 | 3/2015 |
| DE | 102014011609 | 3/2015 |
| DE | 102014217188 | 3/2015 |
| DE | 102013016797 | 4/2015 |
| DE | 102013223357 | 5/2015 |
| DE | 102014100334 | 7/2015 |
| DE | 102014203715 | 9/2015 |
| DE | 202015005208 | 9/2015 |
| DE | 102014106949 | 11/2015 |
| DE | 202014008335 | 1/2016 |
| DE | 102014011727 | 2/2016 |
| DE | 102014215164 | 2/2016 |
| DE | 102014112596 | 3/2016 |
| DE | 102014219644 | 3/2016 |
| DE | 202014008336 | 3/2016 |
| DE | 102014115051 | 4/2016 |
| DE | 102014221167 | 4/2016 |
| DE | 102014019696 | 6/2016 |
| DE | 102014224545 | 6/2016 |
| DE | 102015015504 | 6/2016 |
| DE | 102015014337 | 7/2016 |
| DE | 102015200636 | 7/2016 |
| DE | 102015204216 | 9/2016 |
| DE | 202016005333 | 11/2016 |
| DE | 102015219558 | 4/2017 |
| DE | 102015222171 | 5/2017 |
| EP | 0705724 | 4/1996 |
| EP | 0779668 | 6/1997 |
| EP | 0780915 | 6/1997 |
| EP | 1939028 A1 | 7/2008 |
| EP | 2298690 | 3/2011 |
| EP | 2374646 | 10/2011 |
| EP | 2388851 A1 | 11/2011 |
| EP | 2456003 | 5/2012 |
| EP | 2554420 | 2/2013 |
| EP | 2562065 | 2/2013 |
| EP | 2581249 | 4/2013 |
| EP | 2467276 | 7/2013 |
| EP | 2620997 | 7/2013 |
| EP | 2626231 | 8/2013 |
| EP | 2626232 | 8/2013 |
| EP | 2626233 | 8/2013 |
| EP | 2741343 A1 | 6/2014 |
| EP | 2833436 | 2/2015 |
| EP | 2913863 | 9/2015 |
| EP | 2758262 | 10/2015 |
| EP | 2944493 | 11/2015 |
| EP | 2565958 | 3/2016 |
| EP | 2990247 | 3/2016 |
| EP | 3379598 A1 | 9/2018 |
| EP | 3382774 A1 | 10/2018 |
| FR | 2661281 | 10/1991 |
| FR | 2705926 | 6/1993 |
| FR | 2774044 A1 | 7/1999 |
| FR | 2782399 | 2/2000 |
| FR | 2962076 | 7/2010 |
| FR | 2948072 | 1/2011 |
| FR | 2949096 | 2/2011 |
| FR | 2959454 | 11/2011 |
| FR | 2961960 | 12/2011 |
| FR | 2987001 | 2/2012 |
| FR | 2988039 | 3/2012 |
| FR | 2990386 | 5/2012 |
| FR | 2975230 | 11/2012 |
| FR | 2976731 | 12/2012 |
| FR | 2982566 | 5/2013 |
| FR | 2986374 | 8/2013 |
| FR | 2986744 | 8/2013 |
| FR | 2986910 | 8/2013 |
| FR | 2986911 | 8/2013 |
| FR | 2987000 | 8/2013 |
| FR | 2987001 A1 | 8/2013 |
| FR | 2990386 A1 | 11/2013 |
| FR | 3014035 | 12/2013 |
| FR | 2993511 | 1/2014 |
| FR | 2994340 | 2/2014 |
| FR | 2996193 | 4/2014 |
| FR | 2998715 | 5/2014 |
| FR | 2999809 | 6/2014 |
| FR | 3000002 | 6/2014 |
| FR | 3002910 | 9/2014 |
| FR | 3007209 | 12/2014 |
| FR | 3019688 | 10/2015 |
| FR | 3022402 | 12/2015 |
| FR | 3028456 | 5/2016 |
| FR | 2861441 | 8/2016 |
| GB | 2081495 | 2/1982 |
| GB | 2353151 | 2/2001 |
| GB | 2443272 | 4/2008 |
| GB | 2483272 | 3/2012 |
| GB | 2516120 | 1/2015 |
| JP | 05193370 | 8/1993 |
| JP | H05193366 | 8/1993 |
| JP | H05201356 | 8/1993 |
| JP | H08268083 | 10/1996 |
| JP | H08276752 | 10/1996 |
| JP | H1075504 | 3/1998 |
| JP | H10109548 | 4/1998 |
| JP | H10149805 | 6/1998 |
| JP | 2819927 | 8/1998 |
| JP | 2774044 | 7/1999 |
| JP | H11178115 | 7/1999 |
| JP | 2967711 | 8/1999 |
| JP | 2000041303 | 2/2000 |
| JP | 3085346 B2 | 9/2000 |
| JP | 3199296 | 8/2001 |
| JP | 3284850 | 3/2002 |
| JP | 3085346 | 4/2002 |
| JP | 3284850 | 5/2002 |
| JP | 3284878 | 5/2002 |
| JP | 3286634 | 5/2002 |
| JP | 3489186 | 1/2004 |
| JP | 2004142524 | 5/2004 |
| JP | 2007331669 A | 12/2007 |
| JP | 2011006050 | 1/2011 |
| JP | 2011049151 | 3/2011 |
| JP | 2011152906 | 8/2011 |
| JP | 2013133044 | 7/2013 |
| JP | 2013133044 A | 7/2013 |
| KR | 20120030014 | 3/2012 |
| KR | 20120030014 A | 3/2012 |
| KR | 20140007063 | 1/2014 |
| KR | 101565980 | 11/2015 |
| KR | 101565981 | 11/2015 |
| KR | 20160055712 | 5/2016 |
| KR | 20160001976 | 6/2016 |
| KR | 20160087077 | 7/2016 |
| KR | 101647825 | 8/2016 |
| KR | 20160092902 | 8/2016 |
| KR | 20160104867 | 9/2016 |
| KR | 20160111231 | 9/2016 |
| KR | 20160116383 | 10/2016 |
| KR | 20170000325 | 1/2017 |
| KR | 101704496 | 2/2017 |
| KR | 20170052831 | 5/2017 |
| KR | 20170062845 | 6/2017 |
| KR | 20170065764 | 6/2017 |
| KR | 20170065771 | 6/2017 |
| KR | 20170065854 | 6/2017 |
| KR | 20170070080 | 6/2017 |
| KR | 1020170067240 | 6/2017 |

(56) References Cited

FOREIGN PATENT DOCUMENTS

| | | |
|---|---|---|
| SE | 507909 | 7/1998 |
| TW | 201425112 | 7/2014 |
| TW | I467830 | 1/2015 |
| TW | I482718 | 5/2015 |
| WO | WO0074964 | 12/2000 |
| WO | WO2006100005 | 9/2006 |
| WO | WO2006100006 | 9/2006 |
| WO | WO2008104356 | 9/2008 |
| WO | WO2008104358 | 9/2008 |
| WO | WO2008104376 | 9/2008 |
| WO | WO2008131935 | 11/2008 |
| WO | WO2009080151 | 7/2009 |
| WO | WO2009080166 | 7/2009 |
| WO | WO2009103462 | 8/2009 |
| WO | WO2010004192 | 1/2010 |
| WO | WO2010012337 | 2/2010 |
| WO | WO2010012338 | 2/2010 |
| WO | WO2010012342 | 2/2010 |
| WO | WO2010040520 | 4/2010 |
| WO | WO2010063365 | 6/2010 |
| WO | WO2010069713 | 6/2010 |
| WO | WO2010076053 | 7/2010 |
| WO | WO2010076055 | 7/2010 |
| WO | WO20100796452 | 7/2010 |
| WO | WO2011030041 | 3/2011 |
| WO | WO2011121757 | 6/2011 |
| WO | WO2011083980 | 7/2011 |
| WO | WO2011106851 | 9/2011 |
| WO | WO2011116801 | 9/2011 |
| WO | WO2011116959 | 9/2011 |
| WO | 2011134815 A1 | 11/2011 |
| WO | WO2011134828 | 11/2011 |
| WO | WO2012025710 | 3/2012 |
| WO | WO2012063025 | 5/2012 |
| WO | WO2012065853 | 5/2012 |
| WO | WO2012065855 | 5/2012 |
| WO | WO2012069349 | 5/2012 |
| WO | WO2012084132 | 6/2012 |
| WO | WO2012093233 | 7/2012 |
| WO | WO2012097514 | 7/2012 |
| WO | WO2012114040 | 8/2012 |
| WO | WO2012116608 | 9/2012 |
| WO | WO2012119424 | 9/2012 |
| WO | WO2012163504 | 12/2012 |
| WO | WO2013020707 | 2/2013 |
| WO | WO2013027982 | 2/2013 |
| WO | WO2013042628 | 3/2013 |
| WO | WO2013080008 | 6/2013 |
| WO | WO2013188680 | 12/2013 |
| WO | WO2014191651 | 3/2014 |
| WO | WO2014114511 | 7/2014 |
| WO | WO2014140412 | 9/2014 |
| WO | WO2014140463 | 9/2014 |
| WO | WO2014183995 | 11/2014 |
| WO | WO2015018658 | 2/2015 |
| WO | WO2015043869 | 4/2015 |
| WO | WO2015149660 | 10/2015 |
| WO | WO-2015149660 A1 | 10/2015 |
| WO | WO2016029084 | 2/2016 |
| WO | WO2016046144 | 3/2016 |
| WO | WO2016046145 | 3/2016 |
| WO | WO2016046146 | 3/2016 |
| WO | WO2016046147 | 3/2016 |
| WO | WO2016072822 | 5/2016 |
| WO | WO2016086274 | 6/2016 |
| WO | WO2016106658 | 7/2016 |
| WO | WO2016132280 | 8/2016 |
| WO | WO2016203130 | 12/2016 |
| WO | 2017025592 A1 | 2/2017 |
| WO | WO2017032571 | 3/2017 |
| WO | WO2017084938 | 3/2017 |
| WO | WO2017060608 | 4/2017 |
| WO | WO2017103449 | 6/2017 |
| WO | WO-2018033880 A2 | 2/2018 |
| WO | 2018065554 A1 | 4/2018 |
| WO | 2018149762 A1 | 8/2018 |
| WO | WO-2018213475 A1 | 11/2018 |
| WO | WO-2019055658 A2 | 3/2019 |
| WO | WO-2019-071013 A1 | 4/2019 |

OTHER PUBLICATIONS

English translation of DE 10 2012 200 350 Year: 2013.*
International Searching Authority, International Search Report and Written Opinion for Application No. PCT/IB2018/050066, dated Apr. 26, 2018.
International Searching Authority (KR), International Search Report and Written Opinion for International Application No. PCT/IB2017/055002, dated Jul. 19, 2018.
Korean Intellectual Property Office (ISA), International Search Report and Written Opinion for International Application No. PCT/US2018/033009, dated Sep. 11, 2018.
Korean Intellectual Property Office (ISA), International Search Report and Written Opinion for International Application No. PCT/US2018/032760, dated Sep. 11, 2018.
Korean Intellectual Property Office (ISA), International Search Report and Written Opinion for International Application No. PCT/US2018/050889, dated Mar. 21, 2019.
Korean Intellectual Propery Office (ISA), International Search Report and Written Opinion for International Application No. PCT/US2018/054423, dated Jan. 28, 2019.

* cited by examiner

VEHICLE BATTERY TRAY STRUCTURE WITH NODAL MODULARITY

CROSS-REFERENCE TO RELATED APPLICATIONS

This application claims benefit and priority under 35 U.S.C. § 119(e) of U.S. provisional application Ser. No. 62/442,013, filed Jan. 4, 2017 and U.S. provisional application Ser. No. 62/506,938, filed May 16, 2017, which are hereby incorporated herein by reference in their entireties.

FIELD OF THE INVENTION

The present invention generally relates to vehicle battery support structures, and more particularly to structural components and protective enclosures for concealing and protecting vehicle electronic components and batteries, such as battery packs or modules or the like for electric and hybrid-electric vehicles.

BACKGROUND OF THE INVENTION

Electric and hybrid-electric vehicles are typically designed to locate and package battery modules on the vehicle in a manner that protects the batteries from damage when driving in various climates and environments, and also that protects the batteries from different types of impacts. It is also fairly common for vehicle frames to locate batteries in a portion of the frame or sub-structure of the vehicle, such as between the axles and near the floor of the vehicle, which can distribute the weight of the batteries across the vehicle frame and establish a low center of gravity for the vehicle. Similar to other vehicle components, low weight and high strength-to-weight ratio are important properties in battery support structural components.

SUMMARY OF THE PRESENT INVENTION

The present invention includes a vehicle battery support structure or tray that supports and protects batteries, such as packs or modules or the like, for powering electric and hybrid-electric vehicles, where the battery support structure is modular and customizable due, at least in part, to nodes that are attached between adjacent ends of elongated reinforcement members to form a containment wall that generally surrounds a battery containment area. The module nodes may be standardized in size and located at sections of the containment wall, such as at corner sections, whereby a length of the elongated reinforcement members may be selected to provide a desired size and shape of the battery containment area, so as to more easily construct battery trays to accommodate different types of vehicles. The reinforcement member that forms the containment wall may include a roll formed beam, pultruded beam, or an extruded beam or the like and may be made with steel, polymer, composite, aluminum, or the like, where the cross-sectional shape and material of the reinforcement members is generally consistent and adapted to absorb and reduce impact forces delivered to the battery support structure. Thus, by selecting the length of the reinforcement member attached to the nodes, the size and shape of the battery containment area may be modified or configured to the desired dimensions.

According to one aspect of the present invention, a battery support structure for a vehicle includes a side reinforcement member and an end reinforcement member. The side reinforcement member is configured to extend longitudinally relative to the vehicle, and the end reinforcement member is configured to extend laterally relative to the vehicle. A corner node is attached between adjacent ends of the side reinforcement member and the end reinforcement member to enclose a corner portion of a perimeter wall that generally surrounds a battery containment area. The side reinforcement member and/or the end reinforcement member includes a tubular wall that surrounds a hollow interior area, where an end portion of the corner node engages around an interior surface of the tubular wall to be disposed in the hollow interior area.

According to another aspect of the present invention, a battery support structure for a vehicle includes at least two side reinforcement members and at least two end reinforcement members. The side reinforcement members have hollow interiors extending along a length of the respective side reinforcement member, and the end reinforcement members have hollow interiors extending along a length of the respective end reinforcement member. A plurality of corner nodes are also provided that each have a first end portion engaged within a hollow interior area of one of the side reinforcement members and a second end portion engaged within a hollow interior area of one of the end reinforcement members. The plurality of corner nodes engage the side and end reinforcement members to at least partially form a perimeter wall that generally surrounds a battery containment area.

According to yet another aspect of the present invention, a battery support structure for a vehicle includes a first tray frame member and a second tray frame member. A module node is attached at or within adjacent ends of the first and second tray frame members to form at least a portion of a containment wall that generally surrounds a battery containment area.

According to another aspect of the present invention, a battery support structure for a vehicle includes a plurality of elongated reinforcement members that each have hollow interiors extending along a length of the respective elongated reinforcement member. The battery support structure also includes at least two module nodes that each engage between two adjacent ends of the plurality of elongated reinforcement members to form a containment wall that generally surrounds a battery containment area. To effectuate such engagement, each module node comprises either an exterior dimension sized to fit within a hollow interior of the elongated reinforcement member engaged to the respective module node or an interior dimension sized so that the module node fits tightly around the exterior of the reinforcement member. Optionally, the module nodes may be formed, such as via extrusion, to have a generally consistent cross-sectional shape, such as with an open interior portion, extending along a vertical direction relative to the associated vehicle frame and generally orthogonal to the hollow interior of the elongated reinforcement member engaged with the respective module node. Such vertical orientation of the module nodes may allow the height of the nodes to easily be adapted or formed at a different heights (e.g. by cutting pieces from an elongated extrusion), such as at an angle to provide a height transition for a battery containment wall with different vertical heights.

According to another aspect of the present invention, a method of forming a battery support structure for a vehicle includes providing a plurality of reinforcement members that are selected with lengths that are configured to accommodate a desired size of a battery containment area and/or battery attachment location on a vehicle frame. At least two module nodes are provided to engage between ends of two of the plurality of reinforcement members. The module nodes attach to the plurality of reinforcement members by engaging end portions of the module nodes within elongated hollow interiors or externally around or at the sides of the plurality of reinforcement members and then securing them in place, such as by welding, fastening, and/or adhesive or the like, to form a sealed containment wall that generally surrounds a battery containment area.

These and other objects, advantages, purposes, and features of the present invention will become apparent upon review of the following specification in conjunction with the drawings.

DETAILED DESCRIPTION OF EMBODIMENTS

Figure 1:
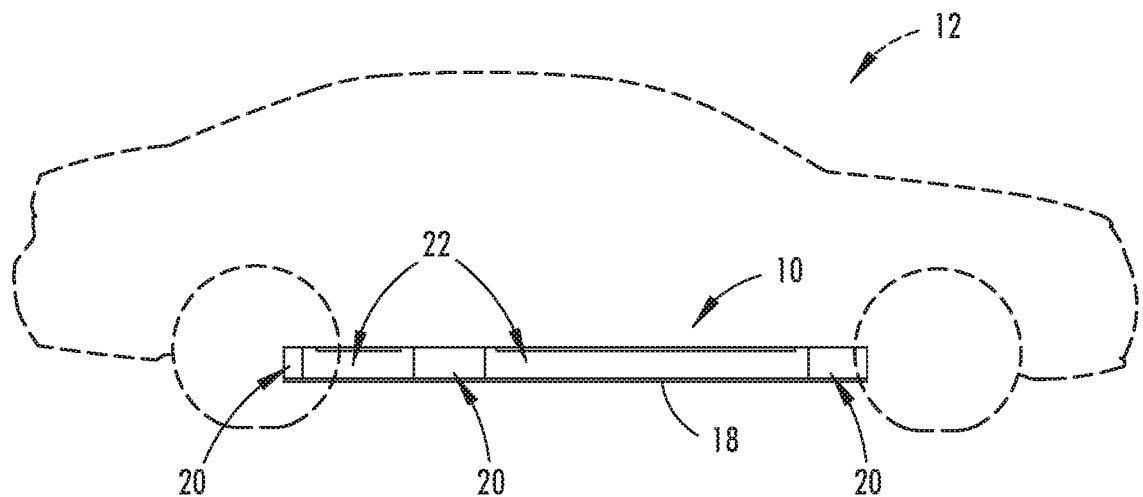
FIG. 1 is a side elevational view of a battery support structure secured at a mounting location on a vehicle in accordance with the present invention.

Referring now to the drawings and the illustrative embodiments depicted therein, a vehicle battery support tray or structure 10 is provided for supporting and protecting batteries, such as battery packs or modules or the like, for an electric or hybrid-electric vehicle 12 (FIG. 1). The battery support structure 10 may be attached or mounted at or near the lower frame or rocker rails 14 of the vehicle 12 (FIG. 2), so as to locate the contained batteries 16 generally in a central location on the vehicle 12, away from probable impact locations, and also in a location that evenly distributes the weight of the batteries 16 and provides the vehicle with a relatively low center of gravity. It is contemplated that the battery support structure 10 may be disengaged or detached from the rocker rails 14 of the vehicle 12, such as for replacing or performing maintenance on the batteries 16 or related electrical components. To facilitate this optional disengagement or detachment, the battery support structure 10 can be a modular design with standardized mounting locations capable of disengagement, such as with bolts or releasable fasteners or the like. The battery support structure 10 may be provided with a base plate 18 that generally forms the lowermost undercarriage surface of the vehicle body. As generally illustrated in FIG. 1, the battery support structure 10 may span below the vehicle with a relatively thin profile, so as to accommodate various vehicle body types and designs.

Figure 2:
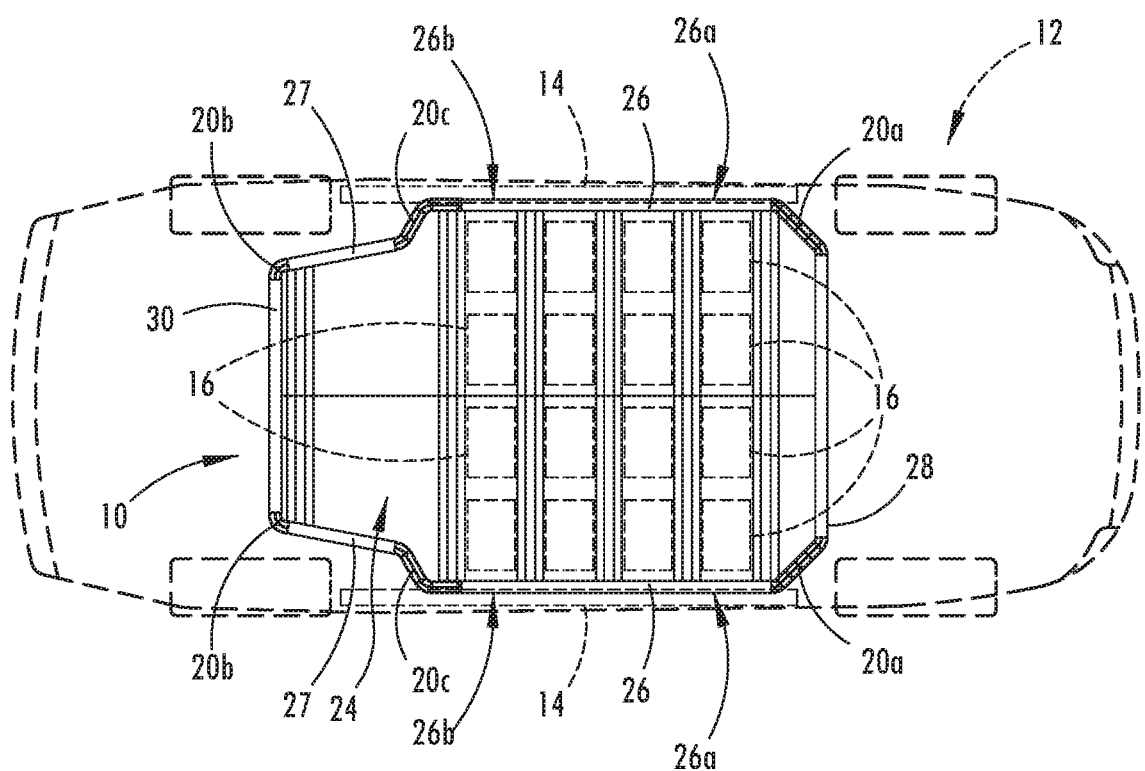
FIG. 2 is top plan view of the battery support structure and the vehicle shown in FIG. 1, illustrating frame rails and batteries held in the battery support structure in dashed lines.
Figure 2A:
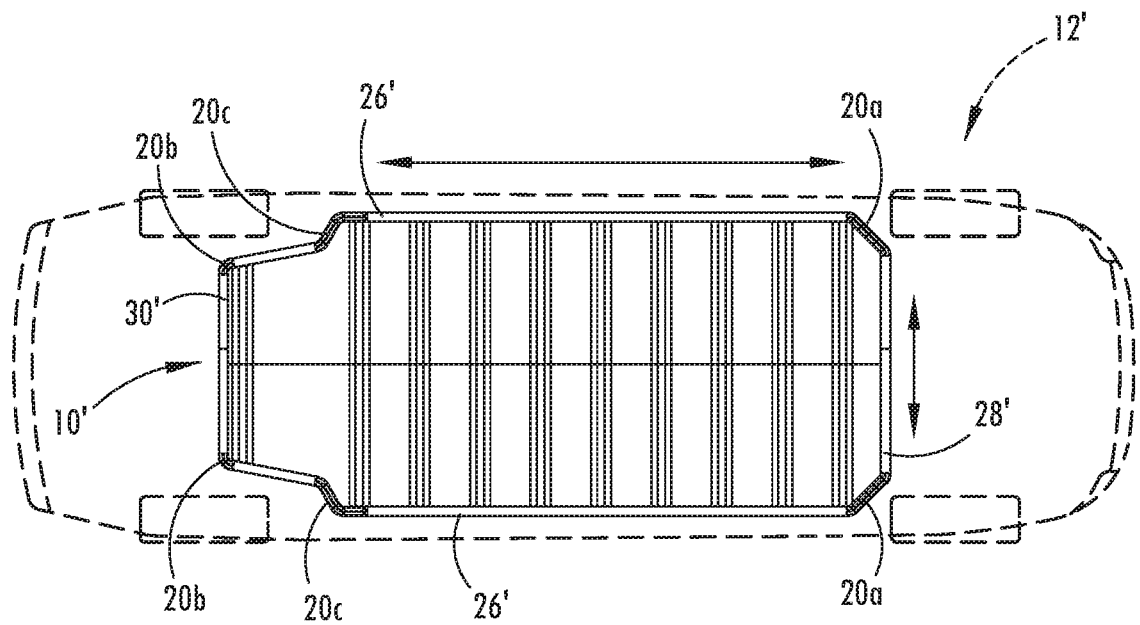
FIG. 2A is top plan view of an additional embodiment of a battery support structure, having a narrower width and longer length than the batter support structure of FIG. 2.
Figure 2B:
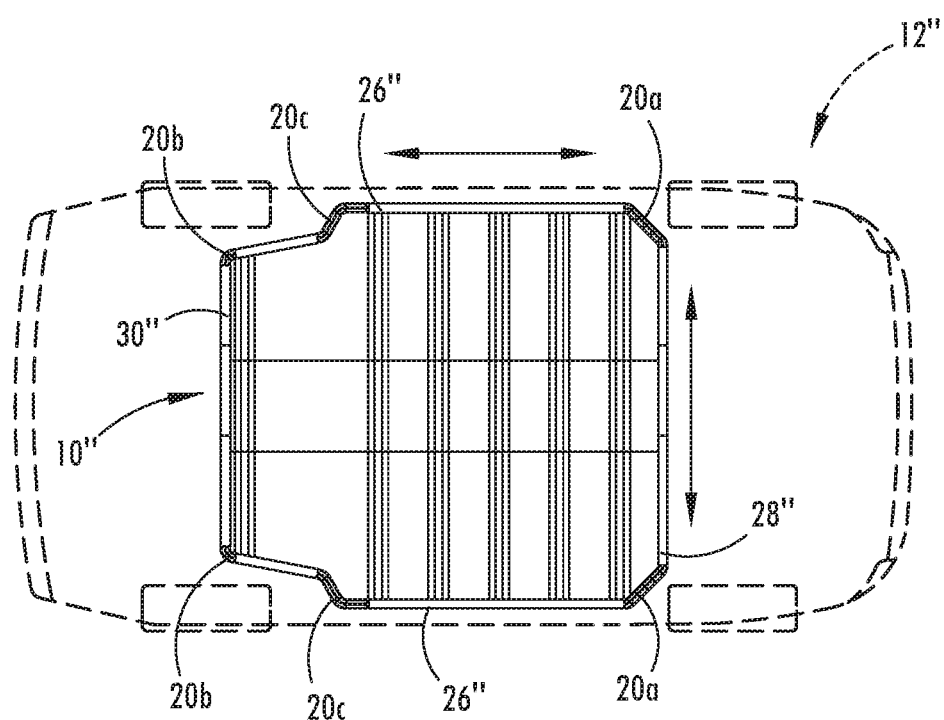
FIG. 2B is top plan view of an additional embodiment of a battery support structure, having a wider width and shorter length than the batter support structure of FIG. 2.

The illustrated vehicle battery support structure 10 is modular and customizable due, at least in part, to the nodes 20 that are attached between adjacent ends of elongated reinforcement members 22, such as done with the nodes 20a-20c shown in FIGS. 2-2B. The attached nodes 20 and reinforcement members 22 form a perimeter containment wall that generally surrounds a battery containment area 24 of the battery support structure 10. The nodes 20 and reinforcement members 22 of the perimeter containment wall are sealed together with the base plate 18 (FIG. 5) to prevent unwanted gases and fluids from entering or exiting the battery containment area 24. The module nodes 20 may be standardized in shape and size and may be located at sections of the perimeter containment wall, such as at corners or wheel well transitions, whereby the lengths of the elongated reinforcement members 22 may be selected or altered to provide or modify the overall shape of the battery support structure 10 within the general constraints of the standardized shapes of the module nodes 20. The illustrated nodes 20 are shaped to provide front corner nodes 20a, rear corner nodes 20b, and wheel well transition nodes 20c that fit the general undercarriage design of several vehicle types and designs. Such a standardized node design allows generally straight reinforcement members 22 to be cut to the length for accommodating the desired sized and shaped battery support structure 10, without having to otherwise account for different types of bends or sweeps of the elongated reinforcement members 22.

Accordingly, a desired length or desired width of the battery containment area 24 may be selected by using corresponding desired lengths of the longitudinally extending side reinforcement members 26 or the desired lengths of the laterally extending front and rear reinforcement members 28, 30. As shown in FIG. 2A, the vehicle 12' is longer and narrower than the vehicle 12 shown in FIG. 2, such that the battery support structure 10' uses longer side reinforcement members 26' and shorter front and rear reinforcement members 28', 30', but uses generally the same nodes 20a-20c. Likewise, as shown in FIG. 2B, the vehicle 12" is shorter and wider than the vehicle 12 shown in FIG. 2, such that the battery support structure 10' uses shorter side reinforcement members 26" and longer front and rear reinforcement members 28", 30", and again uses generally the same nodes 20a-20c. It is also contemplated that a perimeter containment wall may be formed with a single shape or type of module node, such as in the same of the illustrated front corner node 20a, or multiple other shapes or types of module nodes.

The battery containment area 24 of the battery support structure 10 is generally bound on four sides, as shown in FIG. 2, by the longitudinally extending side reinforcement members 26 and by a front reinforcement member 28 and a rear reinforcement member 30 that each extend laterally between the side reinforcement members 26. The side reinforcement member 26 are configured to attached to a frame or rocker rail 14 of the vehicle 12 (FIG. 2) to secure the vehicle battery support structure 10 to the vehicle frame and suspend it away from the ground surface at an inboard location that does not substantially come into a line of sight of a person standing outside of the vehicle 12. Ends of the front and rear reinforcement members 28, 30 engage, respectively, at the front and rear corner nodes 20a, 20b. The front corner nodes 20a also attach to the front ends 26a of the side reinforcement members 26. The rear ends 26b of the side reinforcement members 26 attach at the wheel well transition node 20c, where a wheel well reinforcement member 27 extends rearward from the wheel well transition node 20c to attach at the rear corner node 20b. It is contemplated that additional or fewer reinforcement members 22 and/or nodes 20 may be implemented in alternative designs of a battery containment structure. Accordingly, as illustrated, the reinforcement members 22 includes the side reinforcement members 26, the wheel well reinforcement member 27, the front reinforcement member 28, the rear reinforcement member 30. Similarly, the tray module nodes 20 include the front corner nodes 20a, the rear corner nodes 20b, and the wheel well transition nodes 20c.

The elongated reinforcement members 22 may have hollow interiors 32 or open areas extending along a length of the respective elongated reinforcement member 22. The elongated reinforcement members 22 may include a roll formed beam, a pultruded beam, or an extruded beam or the like, where the shape and material of the reinforcement members 22 may be adapted to absorb and reduce impact forces delivered to an exterior area or portion of the battery support structure 10. For example, the roll formed beam, pultruded beam, or extruded beam may be made with high strength steel, aluminum, polymer or related composites, combinations of materials or like materials. Also, in areas where collision impact may not have a high risk or likelihood of interacting with the containment wall, the reinforcement member 22 in that area may be formed in a more simplified shape with less or lighter weight material.

Figure 3:
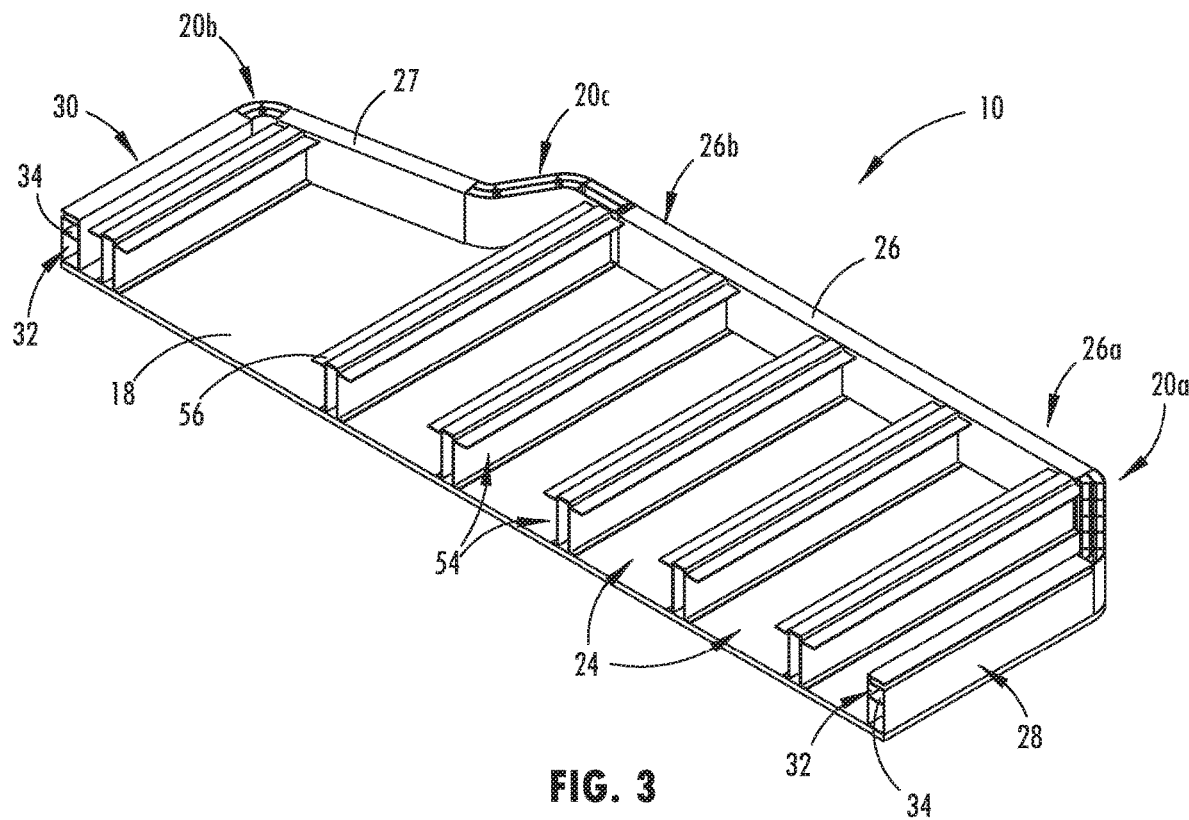
FIG. 3 is a front upper perspective view of a cross section of the battery support structure of FIG. 1, shown separated or detached from the vehicle and with the cross section taken longitudinally along a center of the vehicle.
Figure 12:
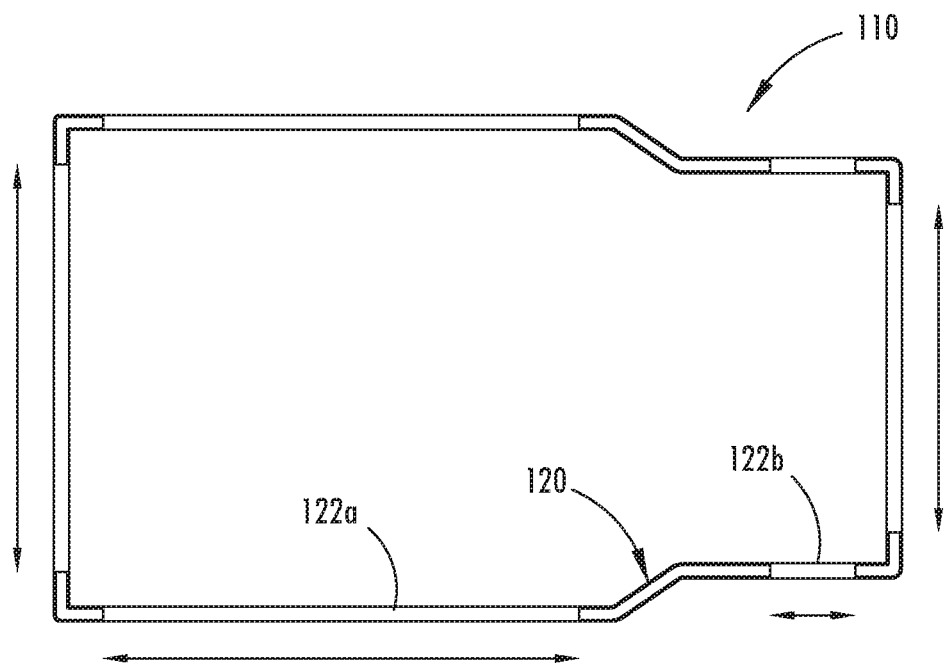
FIG. 12 is a top plan view of an additional embodiment of a battery support structure.
Figure 12A:
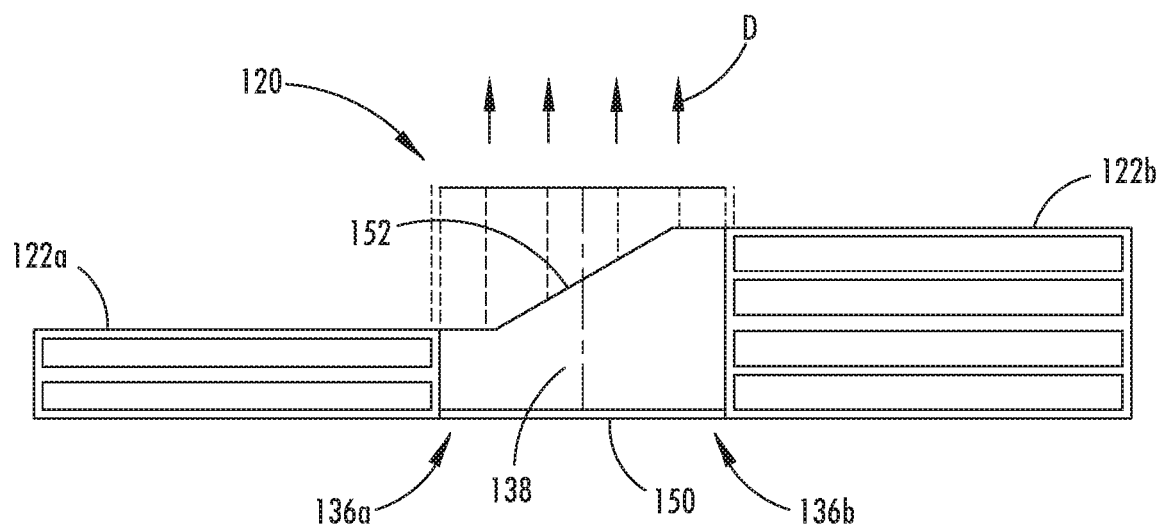
FIG. 12A is a cross-sectional side view of the battery support structure of FIG. 12, showing a direction of formation of the module node.
Figure 13:
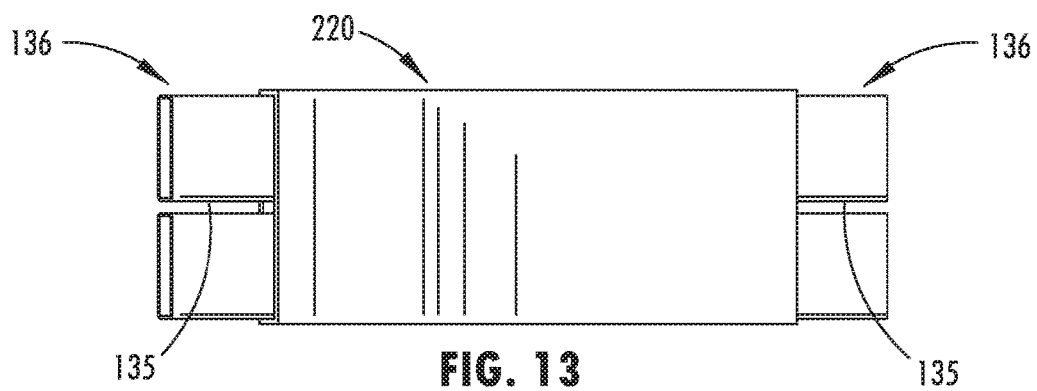
FIG. 13 is a side elevational view of an additional embodiment of a module node.
Figure 14:
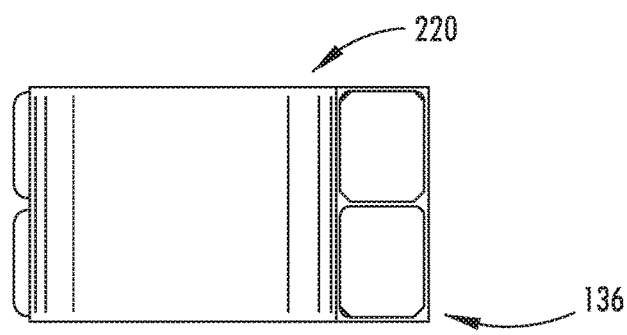
FIG. 14 is an end elevational view of the module node shown in FIG. 13.

For example, as shown in FIG. 3, the front and rear reinforcement members 28, 30 are formed by roll forming a beam that includes adjacent tubes having a common center 34 wall dividing the hollow interior 32 of the beam. In doing so, lateral portions of the roll formed sheet may be formed to extend from opposing sides of the common center wall 34, such that during the roll forming, the lateral portions are bent in the same rotational direction to attach at opposing lateral ends of the common center wall 34 and thereby enclose interior volumes of the adjacent top and bottom tubes on opposing sides of the common center wall 34. To engage the end of a node 20 within the hollow interior 32 of the beam, the common center 34 wall may be trimmed away at select distance into the hollow interior 32 at the ends of the reinforcement members 22 to provide an open rectangular trimmed away area sized for engaging the node 20. In an additional embodiment, such as shown in FIGS. 13 and 14, the ends 136 of the node 120 may include a horizontal slot 135 to receive a center wall of a side reinforcement member when attaching the node 120 within the hollow interior portions of the reinforcement member. Such ends 136, as shown in FIGS. 13 and 14, may include chamfered edges at the ends 136, so as to improve insertion into the hollowing interior portions of the reinforcement member. Other roll formed cross-sectional shapes may also conceivably be incorporated into one or more of the reinforcement members 22, along with cross-sectional shapes that may be formed by extrusion or pultrusion or other forming methods. Also, the reinforcement members may include multiple stacked or connected beams or members, such as to provide additional height at the containment wall surrounding the battery containment area, such as shown by the stack of reinforcement members 122b illustrated in FIG. 12A.

Figure 5:
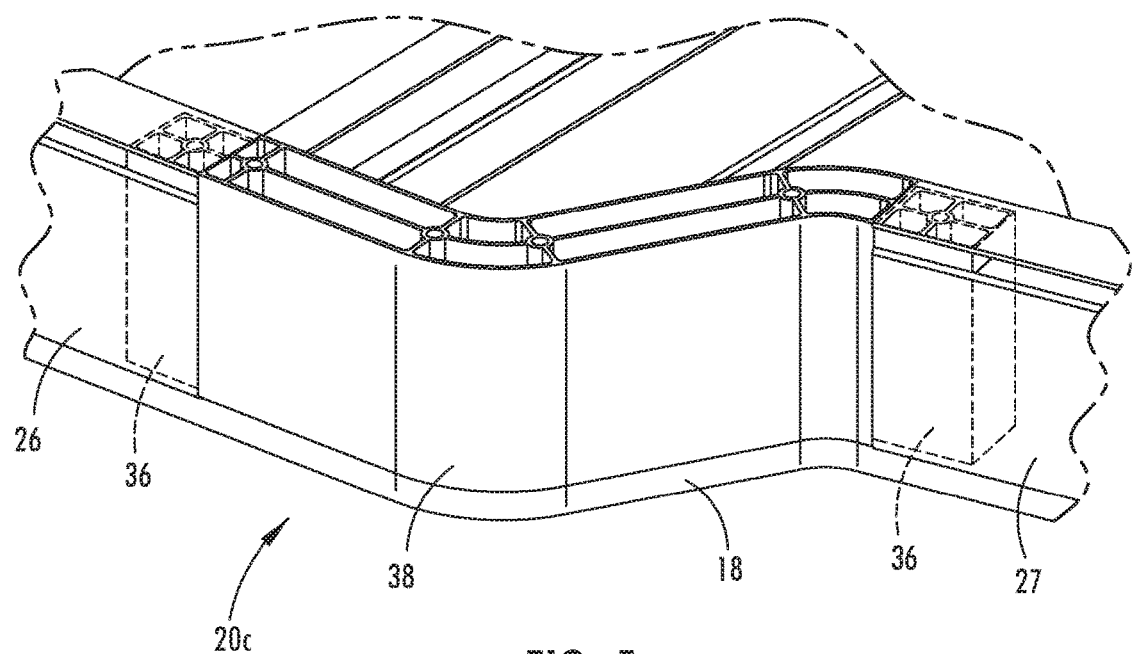
FIG. 5 is an enlarged upper perspective view of a section of the battery support structure of FIG. 3, showing a module node attached between reinforcement members.
Figure 6:
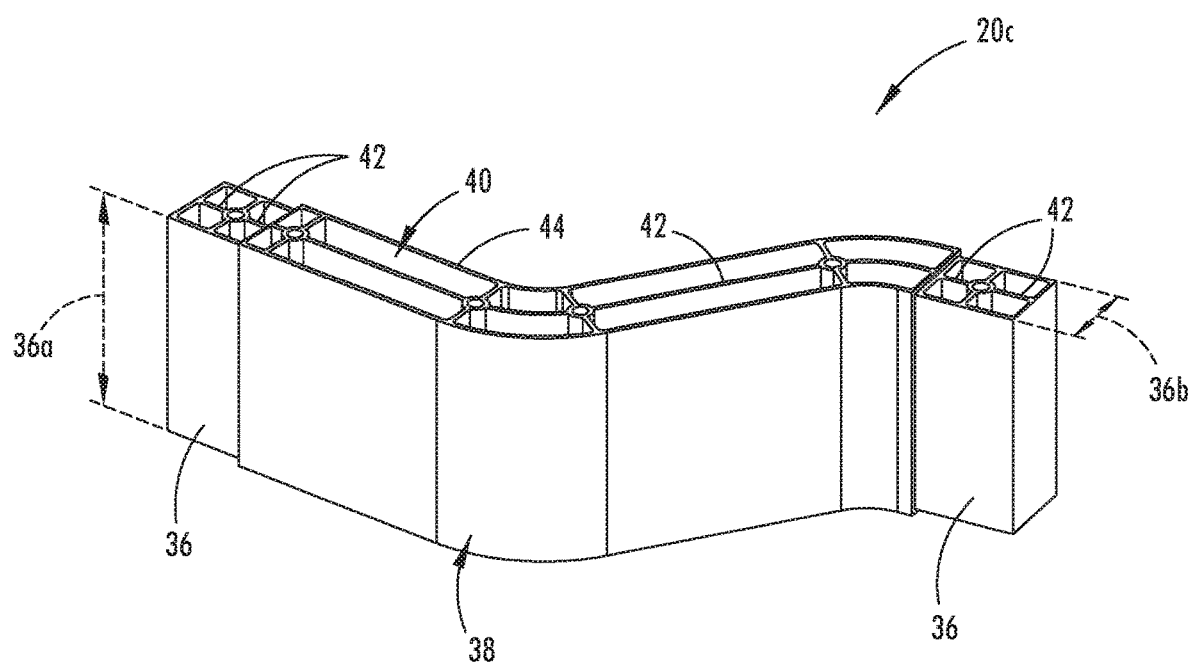
FIG. 6 is an upper perspective view of the module node shown in FIG. 5.
Figure 7:
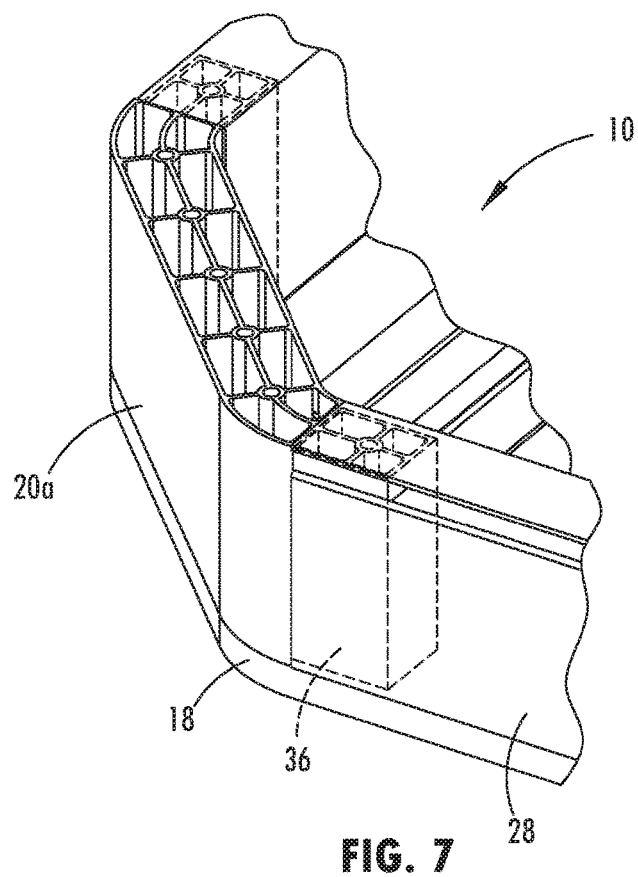
FIG. 7 is an enlarged upper perspective view of a section of the battery support structure of FIG. 3, showing a front corner module node attached between reinforcement members

With respect to the attachment of the module nodes 20 to the reinforcement members, such as shown in FIGS. 5 and 7, the illustrated nodes 20 have end portions 36 that are sized to have an exterior dimension that is sized to fit within the hollow interior 32 of the elongated reinforcement members 22 to provide an overlapping connection. Optionally, it is contemplated that the nodes may be alternatively formed to have open ends that receive the elongated reinforcement members within an interior of the node to similarly provide an overlapping connection. As shown in FIGS. 5 and 7, the nodes 20 are inserted or received into the hollow interior 32 of the reinforcement members, with relatively close tolerances between the exterior dimensions at the ends 36 of the nodes 20 and the interior dimensions of the engaged end section of the reinforcement member 22 that defines the hollow interior 32. As shown in FIG. 6, the illustrated ends 36 have a rectangular shape with a height 36a and width 36b that are both slightly less than the outer dimensions of an intermediate portion 38 of the node 20 at the respective end 36. To form the containment wall of the battery support structure 10 with tight and precise dimensional control, such as for providing a constant height for affixing the base plate 18 and top cover, the difference in thickness of the intermediate portion 38 of the nodes and the ends 36 that engage within the reinforcement member 22 is substantially equal to the wall thickness of the reinforcement members 22 at its ends.

Figure 15:
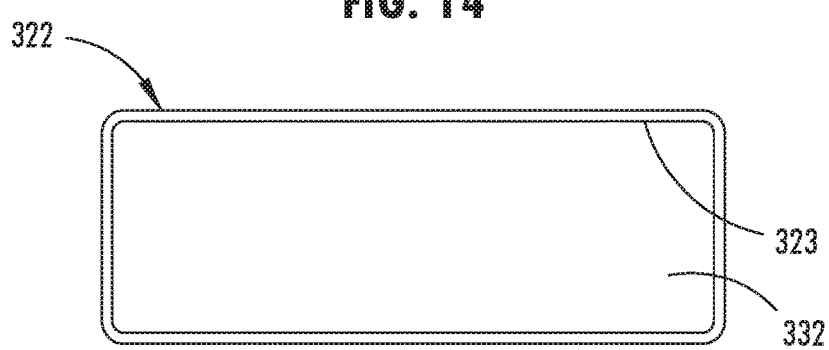
FIG. 15 is an end elevational view of a reinforcement member having an opening configure to be engaged by a module node.
Figure 16:
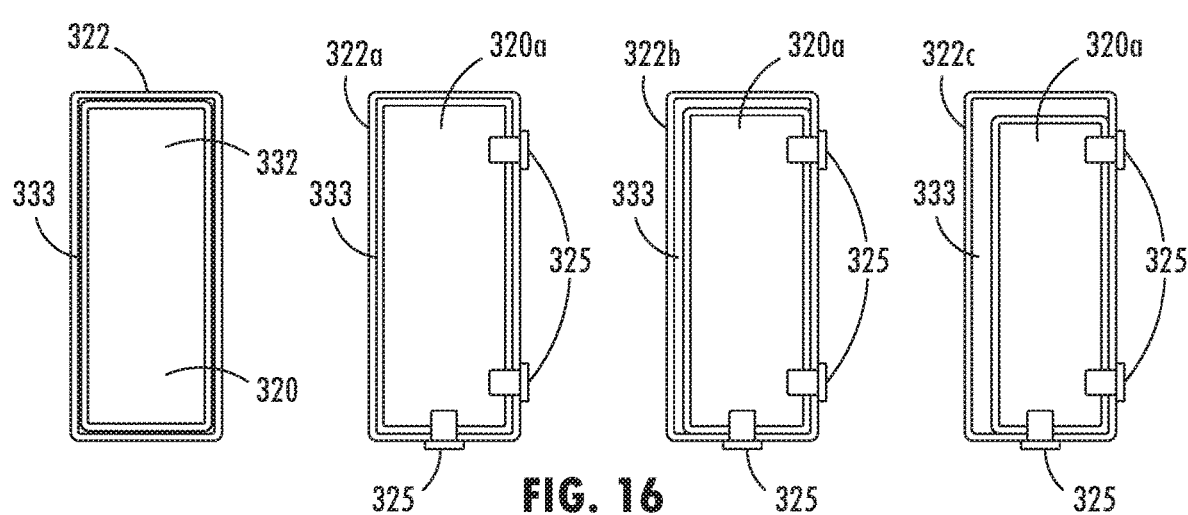
FIG. 16 is cross-sectional end views of the reinforcement member shown in FIG. 15 engaged by different sized nodes within a tolerance that forms an adhesive connection.

Furthermore, as shown at FIGS. 15 and 16, an embodiment of a module node 320 is engaged within a hollow interior 332 of a reinforcement member 322 with an adhesive film 333 used to adhere the exterior of the end of the node 320 to an interior surface 323 of the reinforcement member 322. The adhesive film may include rigid particles, such as glass beads, that are sized to provide a minimum spacing between the node 320 and the reinforcement member 322 to provide a strong adhesion. Also, the adhesive film may be of a type that is configured to expand to fill areas at the interfacing surfaces to accommodate tolerances or other variations in the sizing between the attached parts. In the embodiments shown in FIG. 16, the adhesive film 333 is approximately 1.1 mm in thickness that is applied at each of the planar interfacing surface of the node 320 and the reinforcement member 322, which for a roll formed tubular reinforcement member 322a-322c having an inner diameter with a tolerance of about +/−1 mm and the node 320a-320c being extruded to have an exterior dimension with a tolerance of about +/−0.4 mm, such that the expansion or fill capacity of the 1.1 mm adhesive film is about 300% and will accommodate or fill open spaces provided by the range of tolerances between the reinforcement member and node shown in FIG. 16. Further, such attachment may be further secured by providing fasteners 325, such as flow drill screws, that pierce through the reinforcement member and into the node, as shown FIG. 16. It is contemplated that other various tolerances may be accommodated with other types and thicknesses of adhesive and/or other means of attachment.

Figure 8:
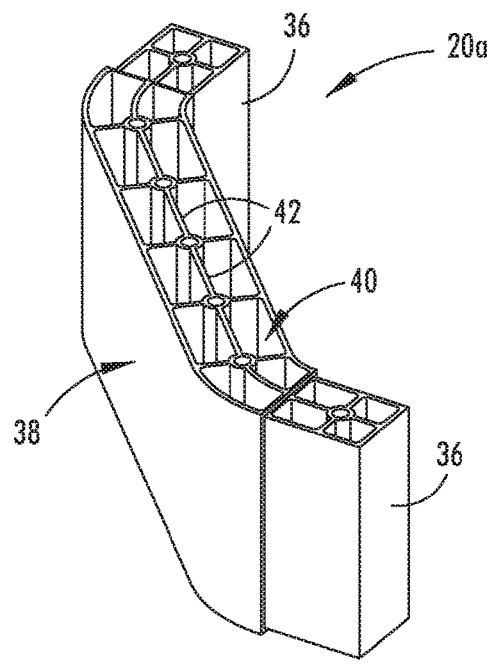
FIG. 8 is an upper perspective view of a front corner module node shown in FIG. 7.
Figure 9:
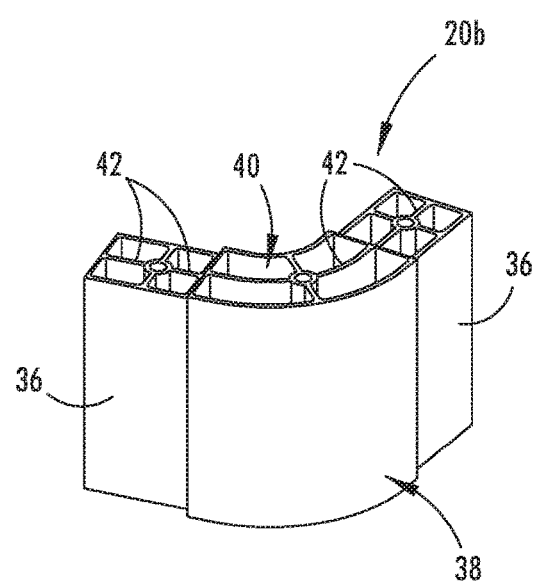
FIG. 9 is an upper perspective view of a rear corner module node of the battery support structure shown in FIG. 3.

The intermediate portion 38 of the node 20 may include a formed shape or curvature, such as shown in FIGS. 6-8 by the various shapes provided by the corner nodes 20a, 20b and the wheel well transition nodes 20c. The intermediate portions 38 of the corner nodes 20a, 20b, each include curvature that provides an angular transition between the ends 36 of approximately ninety degrees, although the curvature of the intermediate portion 38 of the corner node 20a is segmented into approximately two forty-five degree angle transitions with a generally linear segment between the angle transitions. It is contemplated that various alternative angular transitions may be provided at the intermediate portion of additional embodiments of nodes. The intermediate portion 38 of the wheel well transition node 20c has a curvature that insets the wheel well reinforcement member 27 inside the rear wheels of the vehicle, such as shown in FIG. 2. The module nodes 20 may be formed to have a generally consistent cross-sectional shape extending along a generally vertical direction relative to the associated vehicle frame and generally orthogonal to the hollow interior 32 of the elongated reinforcement members engaged with the respective module node. As such, the nodes may be extruded or pultruded from aluminum, polymer, composites, or like materials, or conceivably cast or molded. The cross-section of the nodes 20 may have an open interior portion or hollow volume 40 extending through the module node and arranged to extend generally in a generally vertical direction relative to the vehicle frame. The cross-sectional shape may be defined by an interior wall spaced from an exterior wall 44 to provide the hollow volume 40 between them. As illustrated, the open interior portions or hollow volume 40 of the nodes 20 are divided by structural ribs or internal reinforcements 42 that span across the hollow volume between the interior and exterior walls and extend vertically and in alignment with the exterior surfaces of the nodes 20. By vertically arranging the extrusion direction of the node 20, the surface of the exterior wall 44 (FIG. 6) that forms a portion of the interior surface of the battery containment area 24 is substantially unobstructed to provide a seal with the other portions of the containment wall.

Figure 10:
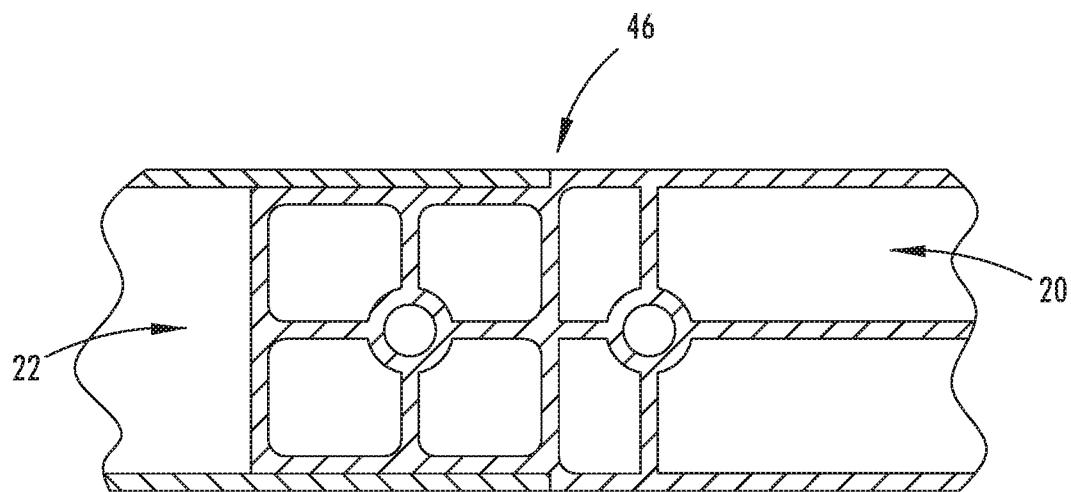
FIG. 10 is a cross-sectional view of an attachment interface between the module node and the reinforcement member shown in FIG. 5.
Figure 11:
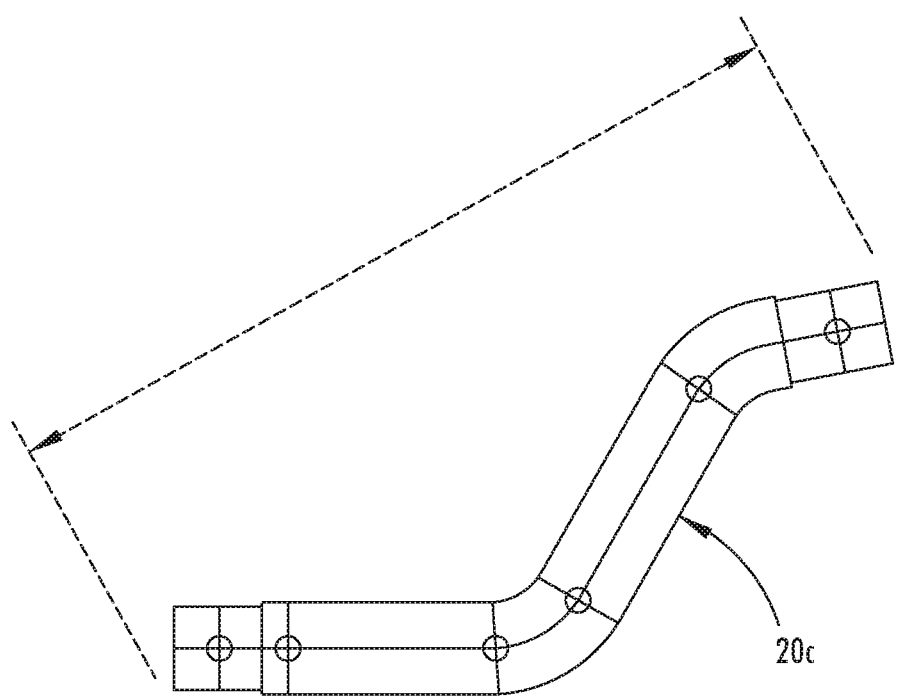
FIG. 11 is a top plan view of the module node shown in FIG. 5.

Upon inserting the end portions 36 of the nodes 20 into the hollow interiors 32 of the reinforcement members 22, the nodes 20 are secured or fixed to the reinforcement member, such as via welding, fastening, adhesive, and/or other conceivable fastening or coupling arrangement. As shown in FIGS. 10 and 11, the exposed seam 46 between the node 20 and the beam 22 may be used to weld the components together, should the materials or metals permit such a form of attachment. Welding may be done with a laser welder, a friction-stir welder, or other generally known forms of welding.

Optionally, a node may include a beam dimension transition or different types of attachments and the opposing ends of the node. For example, the height and/or width of the node may different between the ends to attach to different types of reinforcement members. Also, for example, the node may be welded at one and attached with adhesive and/or fasteners at the other end. As shown in the embodiment illustrated in FIGS. 12-12A, the first end 136a of the node 120 has a height that is less than the height of the opposing second end 136b of the node 120. As such, the first end 136a may engage a reinforcement member 122a with a smaller height than the opposing second end thereof. Thus, the intermediate portion 138 of the node 120 shown in FIG. 12A includes a generally linear height transition to provide different exterior dimensions at the first and second end portions 136a, 136b. The height transition of the illustrated node is easily provide by cutting across the direction D of the extrusion that forms the node 120, leaving the bottom surface 150 of the node in substantially planar alignment between the first and second ends 136a, 136b and providing the height transition at the upper surface 152 of the node. It is contemplated that the height transition may also or alternatively be provided at the lower surface of the node in additional embodiments.

Referring again to FIGS. 1-9, the reinforcement members 22 may be formed with a generally consistent rectangular shaped cross section with a fixed height that respectively defines the height of the of the battery containment area 24. Thus, the side reinforcement members 26 may be formed to provide a height that is substantially identical to the height of the front and rear members 28, 30, such that there may be a generally a constant height about the peripheral containment wall of the battery containment area 24. This consistent peripheral containment wall height provides even or generally flush top and bottom surfaces of the peripheral walls for attaching a top cover or plate at the top surfaces and a bottom cover or base plate 18 at the bottom surfaces, which together seal the upper and lower portions of the battery containment area 24. The top cover may be attached in a manner that is relatively easy to remove while maintaining the sealed battery containment area, such as via bolts or screws or other removable fasteners that compress a gasket or other sealing member between the top cover and the top surface of the peripheral walls, so as to be able to remove the top cover and access the battery modules or other electric components housed in the battery containment area for replacement, maintenance, or inspection or the like. The illustrated base plate 18 attaches at and spans generally below the side reinforcement members 26 and the front and rear members 28, 30 to provide a floor or bottom surface of the battery containment area 24 and a generally sealed interior lower portion of the battery containment area 24. The base plate 18 may be attached to provide the sealed connection along the bottom surface of the peripheral walls via welding, adhesive, bolts, screws, and/or fasteners or the like. The seal between the base plate 18 and the reinforcement members 22 may be reinforced or supplemented with a sealing agent or sealing material, such as an epoxy or silicone sealant or the like.

Figure 4:
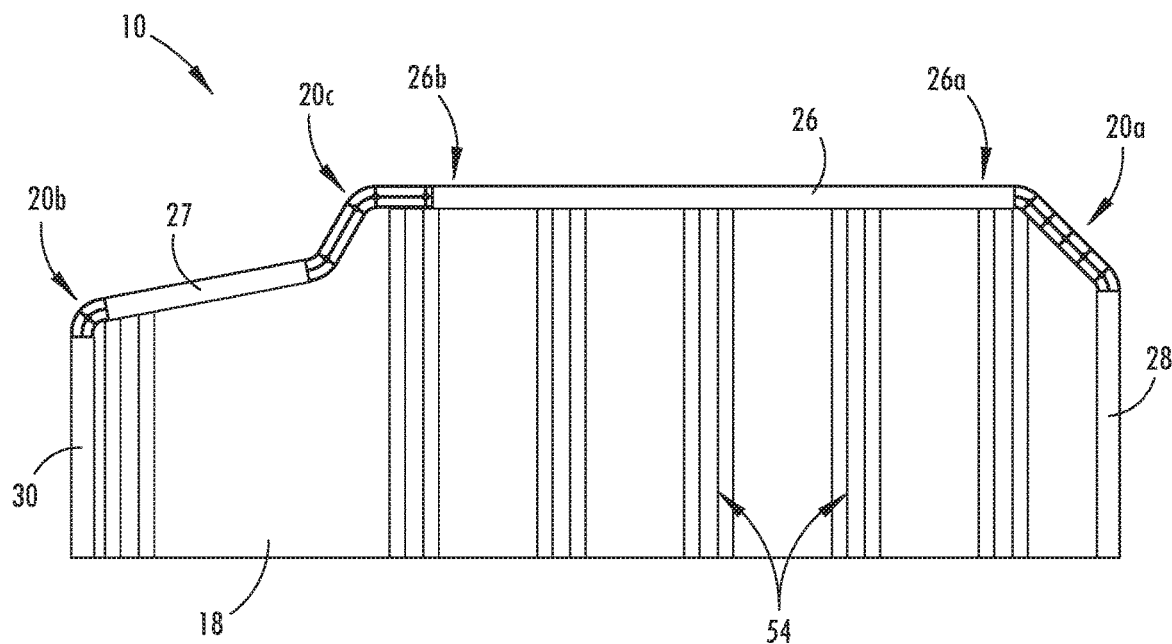
FIG. 4 is a top plan view of the battery support structure shown in FIG. 3.

With reference to FIGS. 2-4, the battery support structure 10 also may include cross members 54 that extend laterally to attach between the inside surfaces of the side reinforcement members 26, 27. The cross members 54 attach at the inside vertical surfaces of the reinforcement members 22 (and nodes 20) and may attach with additional support provided with brackets. Also, a sealing agent or sealing material, such as an epoxy or silicone sealant or the like, may be provided around the brackets and/or at other seams at or along the reinforcement members 22, nodes 20, cross members 54, or other components within the battery containment area to reinforce the seal along the containment wall of the battery containment structure 10.

Further, as shown in FIG. 3, the illustrated cross members 54 have a hat-shaped cross section and an upper member 56 that provides a generally horizontal flange along the cross members, such as for use in attaching battery modules and in providing a precise height for the cross members 54 that corresponds to the reinforcement members 22. Lateral impact force may be transmitted through load paths along the cross members 54 to limit disruption to the battery containment area 24. The cross members 54 span between the reinforcement members 22 to transmit lateral loads and impact forces through generally linear load paths along the cross members 54 to prevent laterally inward deformation to the reinforcement members 22 and thus limit disruption to the battery containment area 24. The cross members 54 are formed to have a height that is less than the height of the peripheral containment wall and preferably to have a height that is generally aligned with the reinforcement members 22, such as shown in FIG. 3. It is contemplated that various other cross member designs may be incorporated into the battery containment structure or otherwise omitted if impact forces are otherwise dissipated.

Figure 17:
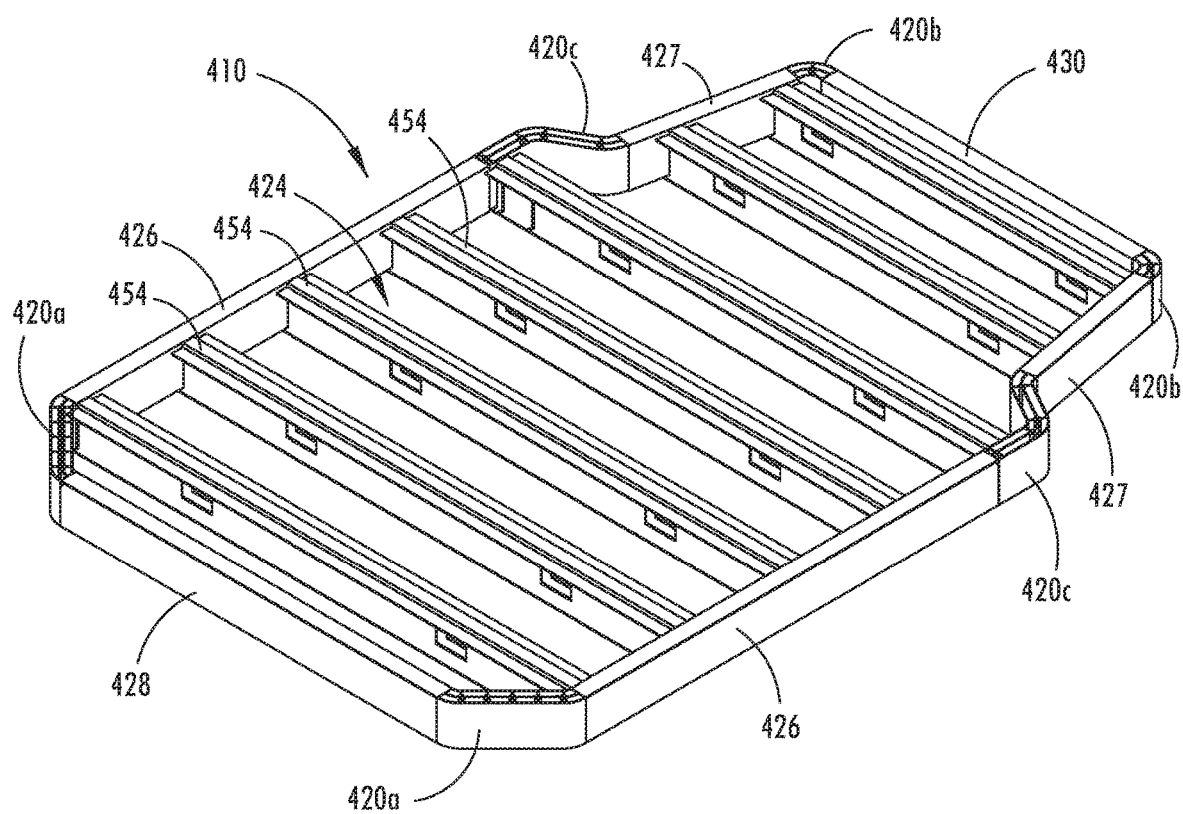
FIG. 17 is an upper perspective view of an additional embodiment of a battery tray that incorporates multiple materials at different components of the battery tray.
Figure 18:
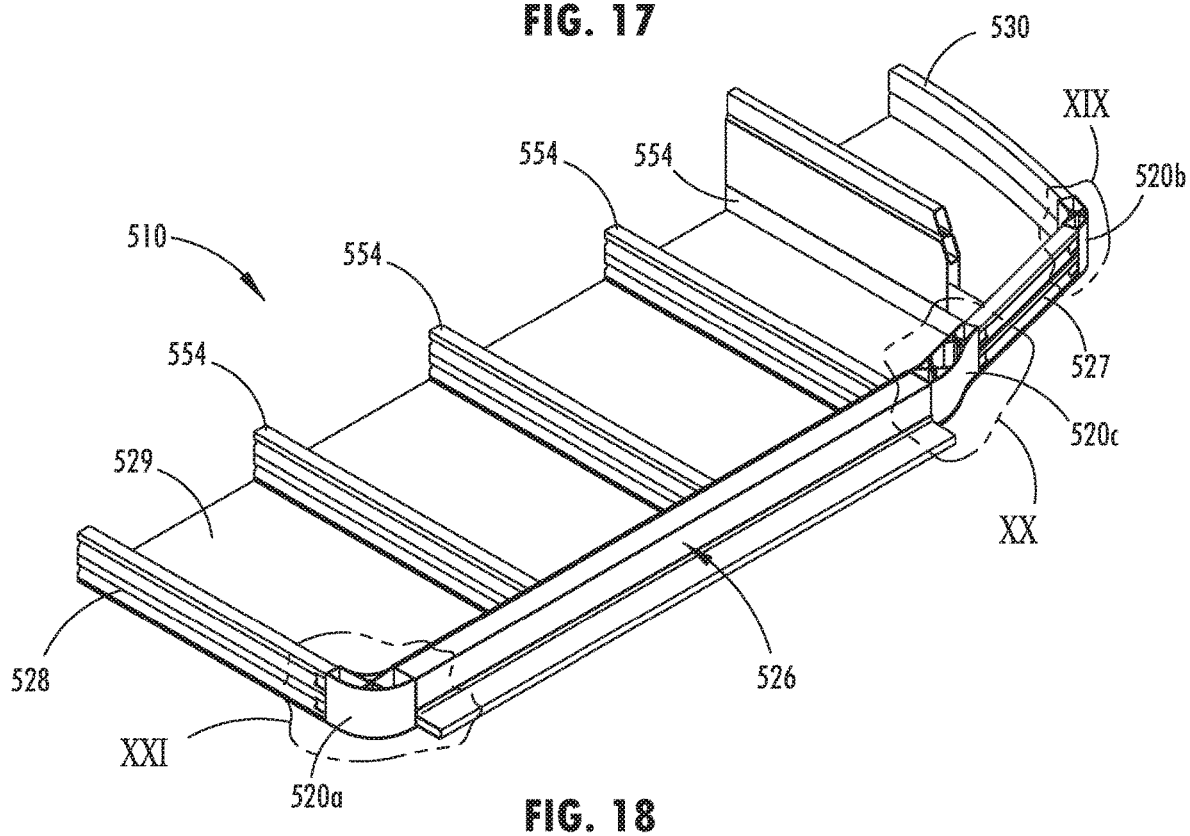
FIG. 18 is a front upper perspective view of a cross section of an additional embodiment of a battery support structure, illustrated with the cross section taken longitudinally along a center of the vehicle.

Another embodiment of a battery tray is shown in FIG. 17, where the battery tray 410 provides a battery containment area 424 that is bound by the longitudinally extending side reinforcement members 426 and wheel well reinforcement member 427 and by the front and rear reinforcement members 428, 430 that each generally extend laterally between the side reinforcement members 426. The side reinforcement members 426 are configured to attach to a rocker rail of the vehicle 412 to secure the vehicle battery support structure 410 to the vehicle frame and suspend it away from the ground surface. Ends of the front and rear reinforcement members 428, 430 engage, respectively, at the front and rear corner nodes 420a, 420b. The front corner nodes 420a also attach to the front ends of the side reinforcement members 426. The rear ends of side reinforcement members 426 attach at the wheel well transition node 420c, where a wheel well reinforcement member 427 extends rearward from the wheel well transition node 420c to attach at the rear corner node 420b.

As illustrated in FIG. 17, the components of the battery support structure 410 may be formed in different shapes and with different materials to optimize performance of the components. Specifically, the side reinforcement members 426 are pultruded with a composite material, such as a carbon fiber reinforced with a thermoplastic or thermosetting resin. The nodes 420a, 420b, 420c are shown extruded with an aluminum alloy. Further, the front and rear reinforcement members 428, 430, cross members 454, and wheel well reinforcement members 427 are roll formed from a steel alloy, such as a high strength martensitic steel.

The structure of an additional embodiment of the battery tray with a similar overall structure to that shown in FIG. 17, but may have a different configuration of the materials used at the different components. For example, the side reinforcement members and cross members may be pultruded with a composite material, such as a carbon fiber reinforced with a thermoplastic or thermosetting resin. The nodes may be extruded with an aluminum alloy. Further, the front and rear reinforcement members and wheel well reinforcement members may be roll formed from a steel alloy, such as a high strength martensitic steel.

Referring now to FIGS. 18-21, an additional embodiment of the battery tray 510 is provided that similarly has side reinforcement members 526, wheel well reinforcement members 527, front and rear reinforcement members 528, 530, and cross members 554 that are coupled with together with nodes 520a-520c to form a ladder-type structure or frame of the battery tray 510 that defines the separate battery containment areas between the cross members 554 for holding the battery modules. The side reinforcement members 526 also include an exterior, generally L-shaped beam or section 526a, where a lower portion of the L shape protrudes laterally outward and may be used to attach the side reinforcement member at a rocker rail of the vehicle. The opposing ends of the cross members 564 engage inside surfaces of the side reinforcement beams 526 and wheel well reinforcement members 527. The front and rear reinforcement members 528, 530 are attach at the front and rear nodes 520a, 520b that are attached at ends the side reinforcement members 526. Also, intermediate nodes 520c are attached at the rear ends of the side reinforcement members 526 to engage the wheel well reinforcement members 527, where the illustrated side reinforcement members 526 and wheel well reinforcement members 527 are roll formed to provide a mono-leg structure, such as described in U.S. Pat. No. 8,716,624, which is hereby incorporated herein by reference in its entirety. Thus, the modular nodes 520a-520c may interface with alternative shapes of beam, such as a roll-formed or extruded or pultruded beam that are together used to form the structure or frame of a battery tray. Such modular nodes may engage the ends of the box beam and adjacent beam, such as within interior cavities of the respective beam.

Figure 19:
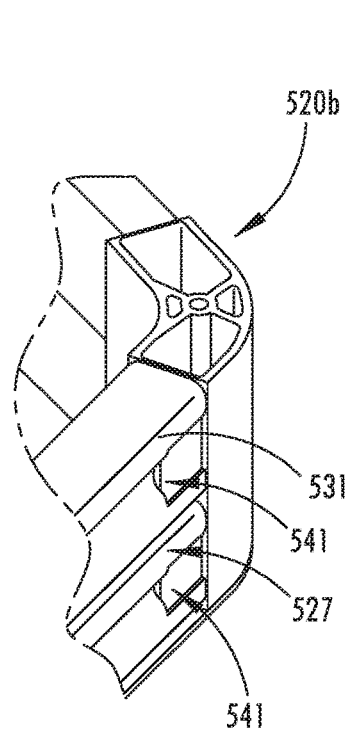
FIG. 19 is an enlarged upper perspective view of a section of the battery support structure shown in FIG. 18, taken at section XIX.
Figure 20:
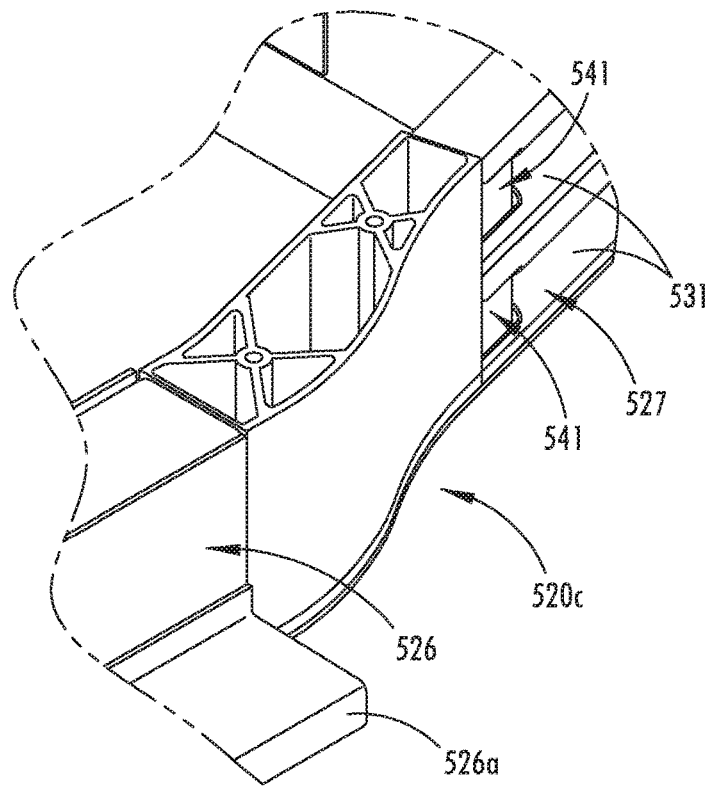
FIG. 20 is an enlarged upper perspective view of a section of the battery support structure shown in FIG. 18, taken at section XX.
Figure 21:
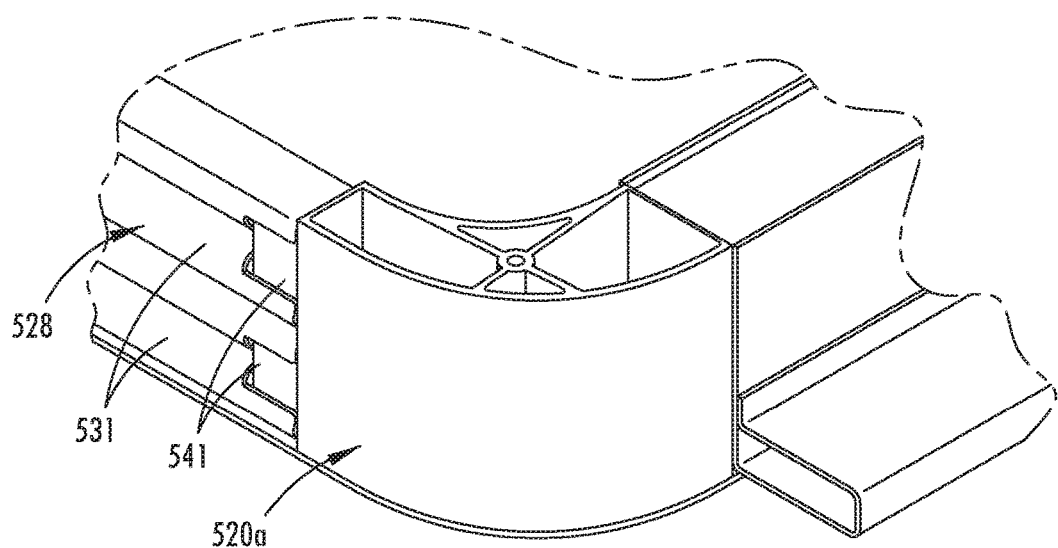
FIG. 21 is an enlarged upper perspective view of a section of the battery support structure shown in FIG. 18, taken at section XXI.

As shown in FIGS. 19-21, the modular nodes 520a-520c have a shape and size that allows transition between different width beams, such as at corners or wheel well transitions. Specifically, the illustrated nodes are shaped to provide front corner nodes 520a, rear corner nodes 520b, and wheel well transition nodes 520c that fit the general undercarriage design of several vehicle types and designs. The nodes and reinforcement members may be attached together with a floor panel 529 to provide a bottom surface for supporting battery modules and related components and to provide a sealed lower surface to prevent unwanted gases and fluids from entering or exiting the additional battery containment area. Further, such nodal attachment also allows the additional reinforcement members be formed from various materials, such as a steel that is roll formed into a beam or an aluminum extrusion or a composite material or the like. To engage the end of a node 520a-520c, the common center wall of the elongated reinforcement members may be trimmed away at select distance into the hollow interior at the ends to provide an open rectangular trimmed away area sized for engaging the node, such as shown in FIGS. 19-21, where the ends of the nodes are shown in cutout areas 541 at the channels or ribs 531 formed along the members or beams. In an additional embodiment, the ends of the nodes may include a horizontal slot or other shape to receive the common center wall and channels or ribs of the elongated reinforcement members when attaching the node modules.

Figure 22:
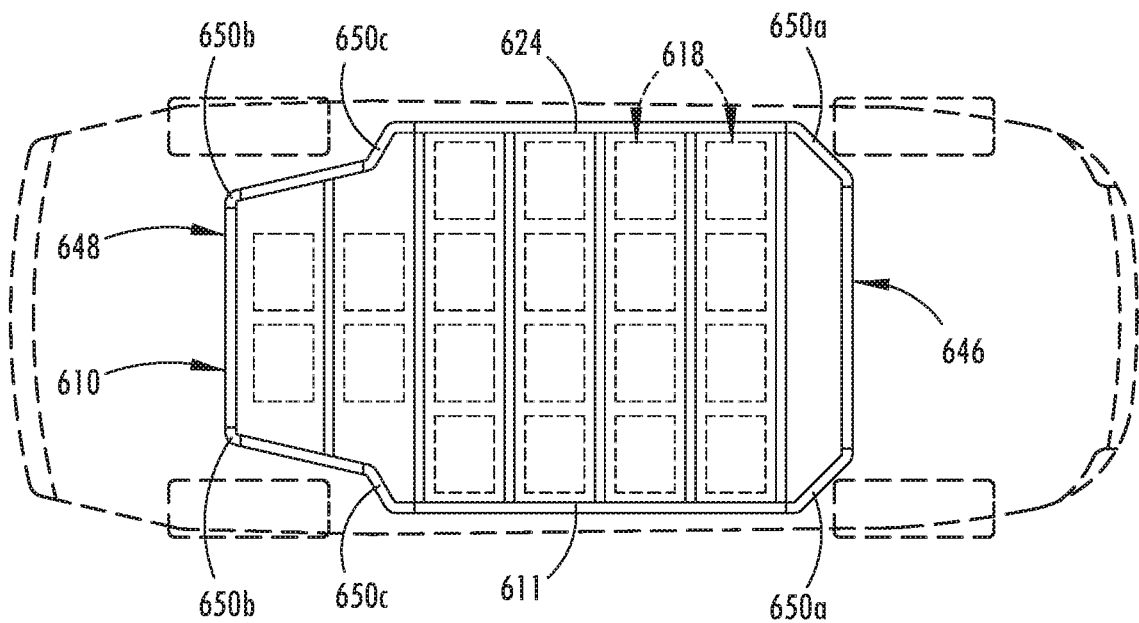
FIG. 22 is a top plan view of an additional embodiment of a battery support structure disposed at a mounting location on a vehicle.
Figure 23:
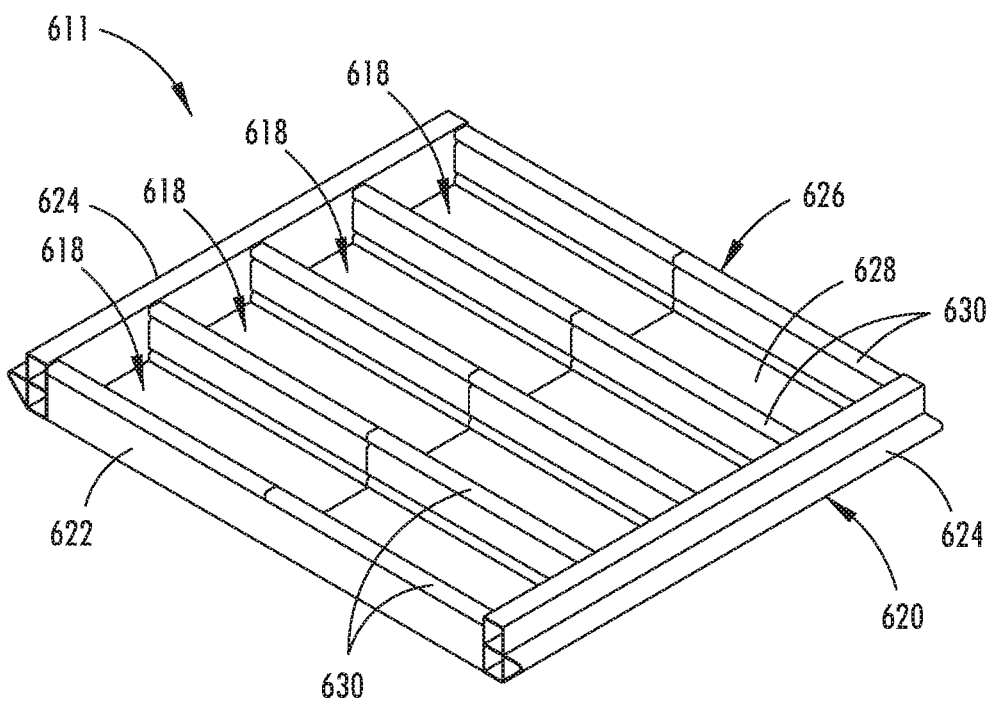
FIG. 23 is an upper perspective view of the battery support structure shown in FIG. 22.

Referring now to FIGS. 22 and 23, yet another embodiment of the battery tray 610 is provided that includes a base tray module 611, such as shown in FIG. 23, that may have two or more tray components that attach or mate together to form a bounded battery containment area, such as shown as a generally square shaped battery frame piece. As shown in FIG. 23, a lower or outer tray component 620 has a panel portion 622 with elongated reinforcement members 624 integrally formed along opposing edges of the panel portion 622. Similarly, an upper or inner tray component 626 has a panel portion 628 with cross members 630 integrally extending across the panel portion 628. The outer and inner tray components 620, 626 may be separately pultruded or extruded to have a substantially constant cross-section along the length of the respective elongated reinforcement members 624 and cross members 630, such as being pultruded with different materials disposed at different sections of the respective tray component.

As further shown in FIG. 22, additional tray components extend the tray frame longitudinally by adding a front section 646 and/or a rear section 648 to the assembled base tray module 611. These added front and rear sections 646, 648 can be utilized for additional desired battery or electronic containment storage and/or to provide additional reinforcement structure to the battery tray, such as to protect against intrusion from impacts. Specifically, the front section 646 is modularly added or attached to the front end of the assembled base tray module 611 to provide front impact and intrusion protection. Similarly, the illustrated rear section 648 is added or attached to the rear end of the assembled base tray module 611 to provide additional battery containment areas between the rear wheels of the vehicle.

These front and rear sections 646, 648 may be attached with modular nodes 650a-650c, such as done with the nodes disclosed in the previously described embodiments. The intermediate nodes 650c may be attached at the rear ends of the elongated reinforcement members 624 for engaging such a rear modular structure that has an additional battery containment area. As shown in FIG. 23, an open ends of the hollow cavities is configured to matably receive an engagement portion of the front and intermediate nodes 650a, 650c. The nodes may be standardized in shape and size and may be located at selected location, such as at corners or wheel well transitions, whereby the nodes may be used to select or alter the size and shape of the front and rear tray sections to provide or modify the overall shape of the battery support tray 610.

Several different attachment techniques and configurations may be used to permanently or releasably secure the battery support structure to a vehicle frame, such as below a floor of the vehicle and generally between the axles. Further, with respect to the general installation or attachment or formation, the steps discussed herein may be performed in various different sequences from those discussed to result engaging, disengaging, or forming the battery support structure or components thereof.

For purposes of this disclosure, the terms "upper," "lower," "right," "left," "rear," "front," "vertical," "horizontal," "inner," "outer," "inner-facing," "outward facing" and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A battery support structure for a vehicle, said battery support structure comprising:
   a side reinforcement member configured to extend longitudinally relative to the vehicle;
   an end reinforcement member configured to extend laterally relative to the vehicle;
   a corner node attached between adjacent ends of the side reinforcement member and the end reinforcement member to enclose a corner portion of a perimeter wall that generally surrounds a battery containment area, the corner node comprising a bottom surface and a top surface relative to the vehicle;
   wherein the corner node comprises a consistent cross-sectional shape extending between the bottom surface and the top surface of the corner node, the cross-sectional shape defined by an interior wall spaced from an exterior wall to provide a hollow volume that extends between openings at the bottom and top surfaces of the corner node, the corner node further comprising internal reinforcements that span across the hollow volume between the interior and exterior walls; and
   wherein at least one of the side reinforcement member and the end reinforcement member includes a tubular wall that surrounds a hollow interior area, and wherein an end portion of the corner node engages around an interior surface of the tubular wall to be disposed in the hollow interior area.

2. The battery support structure of claim 1, wherein a length of at least one of the side reinforcement member and the end reinforcement member is selected to provide a desired size and shape of the battery containment area.

3. The battery support structure of claim 1, wherein the end portion of the corner node includes the consistent cross-sectional shape and an end wall that connects between the interior and exterior walls and borders the hollow volume.

4. The battery support structure of claim 1, wherein the hollow interior portion vertically extends through the corner node.

5. The battery support structure of claim 4, wherein the internal reinforcements extend vertically relative to the vehicle between the lower and upper surfaces of the corner node.

6. The battery support structure of claim 1, wherein the corner node includes (i) a first end portion engaged within a hollow interior area of the side reinforcement member, (ii) a second end portion engaged within a hollow interior area of the end reinforcement member, and (iii) an intermediate portion between the first and second end portions.

7. The battery support structure of claim 6, wherein the intermediate portion of the corner node includes a height that is substantially equal to an exterior height of at least one of the side reinforcement member and the end reinforcement member.

8. The battery support structure of claim 7, wherein an upper surface of the corner node is aligned with upper surfaces of the side and end reinforcement members to form a substantially consistent upper surface configured for attaching a cover over the battery containment area.

9. The battery support structure of claim 1, wherein a base plate is attached along a lower surface of at least one of the corner node, the side reinforcement member, and the end reinforcement member to form a floor surface of the battery containment area.

10. The battery support structure of claim 9, further comprising a plurality of cross members attached at an interior surface of the side reinforcement member and extending laterally across the battery containment area and configured for lateral impact force to be transmitted through load paths along the plurality of cross members to limit disruption to the battery containment area.

11. A battery support structure for a vehicle, said battery support structure comprising:
    at least two side reinforcement members having hollow interiors extending along a length of the respective side reinforcement member;
    at least two end reinforcement members having hollow interiors extending along a length of the respective end reinforcement member;
    a plurality of corner nodes, each having a first end portion engaged within a hollow interior area of one of the side reinforcement members and a second end portion engaged within a hollow interior area of one of the end reinforcement members, wherein the plurality of corner nodes engage the side and end reinforcement members to at least partially form a perimeter wall that generally surrounds a battery containment area, the plurality of corner nodes each comprise a bottom surface and a top surface relative to the vehicle; and
    wherein the plurality of corner nodes each comprise a consistent cross-sectional shape extending between the bottom surface and the top surface thereof, the cross-sectional shape defined by an interior wall spaced from an exterior wall to provide a hollow volume that extends between openings at the bottom and top surfaces of the corner node, the plurality of corner nodes each further comprising internal reinforcements that span across the hollow volume between the interior and exterior walls.

12. The battery support structure of claim 11, wherein a length of at least two of the side reinforcement members and/or a length of at least two of the end reinforcement members is selected to provide a desired respective length or width of the battery containment area.

13. The battery support structure of claim 11, wherein the first and second end portions each includes the consistent cross-sectional shape, and wherein the hollow volume extends between the upper and lower surfaces in a direction orthogonal to the length of the respective engaged side reinforcement member.

14. The battery support structure of claim 13, wherein the corner node includes a first end wall and a second end wall each that connect between the interior and exterior walls at the respective first and second end portions.

15. The battery support structure of claim 11, wherein the corner node includes an intermediate portion between the first and second end portions that includes a height that is substantially equal to an exterior height of the engaged side reinforcement member and the engaged end reinforcement member.

16. The battery support structure of claim 15, wherein an upper surface of the corner node is aligned with upper surfaces of the engaged side and end reinforcement members to form a substantially consistent upper surface.

17. The battery support structure of claim 11, wherein a base plate is attached along a lower surface of the corner node and the side and end reinforcement members to form a floor surface of the battery containment area.

18. The battery support structure of claim 17, further comprising a plurality of cross members attached at and spanning laterally between two of the side reinforcement members and across the battery containment area, wherein the end reinforcement members include a front wall section and a rear wall section that are substantially parallel with the cross members.

19. A battery support structure for a vehicle, said battery support structure comprising:
    a first tray frame member;
    a second tray frame member;
    a module node attached at adjacent ends of the first and second tray frame members to form at least a portion of a containment wall that generally surrounds a battery containment area, the module node having end portions that each engage in a hollow interior area of the respective first or second frame member, the module node comprising a bottom surface and a top surface relative to the vehicle; and
    wherein the module node comprises a consistent cross-sectional shape extending between the bottom surface and the top surface of the module node, the cross-sectional shape defined by an interior wall spaced from an exterior wall to provide a hollow volume that extends between openings at the bottom and top surfaces of the module node, the module node further comprising internal reinforcements that span across the hollow volume between the interior and exterior walls.

20. The battery support structure of claim 19, wherein the module node comprise a corner section of the containment wall, and wherein a length of the first or second tray frame member is selected to provide a desired length or width of the battery containment area.

21. The battery support structure of claim 19, wherein the first tray frame member is configured to extend longitudinally relative to the vehicle, and wherein the second tray frame member is configured to extend laterally relative to the vehicle.

22. The battery support structure of claim 19, wherein the hollow interior areas of the first tray frame member and the second tray frame member are surrounded by a tubular wall of the respective first or second tray frame member.

* * * * *